(12) United States Patent
Kim et al.

(10) Patent No.: US 10,129,824 B2
(45) Date of Patent: Nov. 13, 2018

(54) METHOD AND APPARATUS FOR TRANSMITTING AND RECEIVING DATA BY USING PLURALITY OF CARRIERS IN MOBILE COMMUNICATION SYSTEMS

(71) Applicant: Samsung Electronics Co., Ltd., Suwon-si, Gyeonggi-do (KR)

(72) Inventors: Soeng Hun Kim, Yongin-si (KR); Jae Hyuk Jang, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/243,280

(22) Filed: Aug. 22, 2016

(65) Prior Publication Data
US 2016/0360479 A1    Dec. 8, 2016

Related U.S. Application Data

(63) Continuation of application No. 14/364,190, filed as application No. PCT/KR2013/000669 on Jan. 28, 2013.
(Continued)

(51) Int. Cl.
*H04W 36/08* (2009.01)
*H04W 52/02* (2009.01)
(Continued)

(52) U.S. Cl.
CPC ......... *H04W 52/0206* (2013.01); *H04W 8/24* (2013.01); *H04W 36/0088* (2013.01);
(Continued)

(58) Field of Classification Search
CPC ............... H04W 24/10; H04W 76/021; H04W 52/0206; H04W 84/045
See application file for complete search history.

(56) References Cited

U.S. PATENT DOCUMENTS 6,370,390 B1    4/2002  Salin et al.
7,437,178 B2   10/2008  Jeong et al.
(Continued)

FOREIGN PATENT DOCUMENTS

CN    1229562 A     9/1999
CN    101120611 A   2/2008
(Continued)

OTHER PUBLICATIONS

Juniper, "Overview of PDP contexts and Bearers", Nov. 16, 2011, retrieved at http://www.juniper.net/techpubs/en_US/junos-mobility11.2/topics/concept/gateways-mobility-bearer-overview.html.*

(Continued)

*Primary Examiner* — Asad Nawaz
*Assistant Examiner* — Zhaohui Yang
(74) *Attorney, Agent, or Firm* — Jefferson IP Law, LLP

(57) ABSTRACT

The method for transmitting and receiving data at a base station in a wireless communication system according to one embodiment of the present invention includes the steps of receiving a performance report from a terminal, determining whether the addition of a serving cell is necessary, when the addition of the serving cell is necessary, transmitting a request for receiving a cell identifying signal to one or more other base stations on the basis of the received performance report and transmitting a request for transmitting the cell identifying signal to the terminal. According to the embodiment, in a network in which a small cell and a macro cell are overlapped and operated, the terminal can minimize battery consumption and quickly recognize the small cell.

16 Claims, 19 Drawing Sheets

Related U.S. Application Data

(60) Provisional application No. 61/591,385, filed on Jan. 27, 2012, provisional application No. 61/592,568, filed on Jan. 30, 2012, provisional application No. 61/595,646, filed on Feb. 6, 2012, provisional application No. 61/600,179, filed on Feb. 17, 2012, provisional application No. 61/649,910, filed on May 21, 2012.

(51) Int. Cl.
  *H04W 8/24* (2009.01)
  *H04W 36/00* (2009.01)
  *H04W 84/04* (2009.01)

(52) U.S. Cl.
  CPC ...... *H04W 52/0229* (2013.01); *H04W 84/045* (2013.01); *Y02D 70/00* (2018.01); *Y02D 70/1242* (2018.01); *Y02D 70/1262* (2018.01); *Y02D 70/1264* (2018.01); *Y02D 70/23* (2018.01); *Y02D 70/24* (2018.01)

(56) References Cited

U.S. PATENT DOCUMENTS

| | | |
|---|---|---|
| 7,899,391 B2 | 3/2011 | Becker |
| 8,203,987 B2 | 6/2012 | Ishii et al. |
| 8,588,745 B2 | 11/2013 | Gupta et al. |
| 8,638,705 B2 | 1/2014 | Park et al. |
| 8,649,288 B2 | 2/2014 | He et al. |
| 8,743,896 B2 | 6/2014 | Wu |
| 8,774,818 B2 | 7/2014 | Lim et al. |
| 8,792,417 B2 | 7/2014 | Yeoum et al. |
| 8,886,184 B2 | 11/2014 | Cho et al. |
| 8,942,630 B2 | 1/2015 | Lee et al. |
| 9,072,025 B2 | 6/2015 | Jen et al. |
| 9,668,177 B2 | 5/2017 | Grob-Lipski et al. |
| 9,713,104 B2 | 7/2017 | Zhao et al. |
| 2004/0053623 A1* | 3/2004 | Hoff ................. H04W 24/04 455/452.1 |
| 2004/0131026 A1 | 7/2004 | Kim et al. |
| 2004/0180675 A1 | 9/2004 | Choi et al. |
| 2005/0090278 A1* | 4/2005 | Jeong ................. H04W 36/0055 455/525 |
| 2006/0221872 A1 | 10/2006 | Jones et al. |
| 2006/0281466 A1 | 12/2006 | Gholmieh et al. |
| 2007/0268877 A1 | 11/2007 | Buckley et al. |
| 2008/0130588 A1 | 6/2008 | Jeong et al. |
| 2008/0240439 A1* | 10/2008 | Mukherjee ............ H04W 28/06 380/272 |
| 2008/0318558 A1 | 12/2008 | Bouazizi et al. |
| 2009/0034452 A1 | 2/2009 | Somasundaram et al. |
| 2009/0170498 A1 | 7/2009 | Venkatasubramanian et al. |
| 2009/0232118 A1 | 9/2009 | Wang et al. |
| 2009/0239525 A1 | 9/2009 | Cai et al. |
| 2009/0249641 A1 | 10/2009 | Graham et al. |
| 2009/0262681 A1 | 10/2009 | Park et al. |
| 2010/0041384 A1 | 2/2010 | Kazmi |
| 2010/0093386 A1 | 4/2010 | Damnjanovic et al. |
| 2010/0210268 A1 | 8/2010 | Lim et al. |
| 2010/0296467 A1 | 11/2010 | Pelletier et al. |
| 2010/0317356 A1 | 12/2010 | Roessel et al. |
| 2011/0038277 A1 | 2/2011 | Hu et al. |
| 2011/0051609 A1 | 3/2011 | Ishii et al. |
| 2011/0103328 A1 | 5/2011 | Lee et al. |
| 2011/0108199 A1 | 5/2011 | Miller |
| 2011/0164560 A1 | 7/2011 | Ki et al. |
| 2011/0170503 A1 | 7/2011 | Chun et al. |
| 2011/0171967 A1 | 7/2011 | Lee et al. |
| 2011/0183662 A1 | 7/2011 | Lee et al. |
| 2011/0194505 A1 | 8/2011 | Faccin et al. |
| 2011/0195668 A1 | 8/2011 | Lee et al. |
| 2011/0201307 A1 | 8/2011 | Segura |
| 2011/0243106 A1 | 10/2011 | Hsu et al. |
| 2011/0249641 A1* | 10/2011 | Kwon ................. H04W 74/0833 370/329 |
| 2011/0250910 A1 | 10/2011 | Lee et al. |
| 2011/0299415 A1 | 12/2011 | He et al. |
| 2011/0312316 A1 | 12/2011 | Baldemair et al. |
| 2012/0020231 A1 | 1/2012 | Chen et al. |
| 2012/0051297 A1 | 3/2012 | Lee et al. |
| 2012/0108199 A1 | 5/2012 | Wang et al. |
| 2012/0218922 A1 | 8/2012 | Klingenbrunn et al. |
| 2013/0265866 A1 | 10/2013 | Yi et al. |
| 2013/0322302 A1 | 12/2013 | Gholmieh et al. |
| 2014/0023032 A1 | 1/2014 | Kim et al. |
| 2014/0220963 A1 | 8/2014 | Jung et al. |
| 2014/0233516 A1 | 8/2014 | Chun et al. |
| 2014/0235271 A1 | 8/2014 | Jung et al. |
| 2014/0242974 A1 | 8/2014 | Lee et al. |
| 2017/0195020 A1 | 7/2017 | Ko et al. |

FOREIGN PATENT DOCUMENTS

| | | |
|---|---|---|
| CN | 101553054 A | 10/2009 |
| CN | 101682896 A | 3/2010 |
| CN | 101766010 A | 6/2010 |
| CN | 101772928 A | 7/2010 |
| CN | 101803234 A | 8/2010 |
| CN | 101808406 A | 8/2010 |
| CN | 101841830 A | 9/2010 |
| CN | 101841889 A | 9/2010 |
| CN | 101998432 A | 3/2011 |
| CN | 102025409 A | 4/2011 |
| CN | 102027798 A | 4/2011 |
| CN | 102098655 A | 6/2011 |
| CN | 102104905 A | 6/2011 |
| CN | 102123520 A | 7/2011 |
| CN | 102124766 A | 7/2011 |
| CN | 102150454 A | 8/2011 |
| CN | 102170644 A | 8/2011 |
| EP | 1 597 842 | 11/2005 |
| EP | 2265077 A1 | 12/2010 |
| EP | 2498566 A2 | 9/2012 |
| GB | 2461780 A | 1/2010 |
| JP | 2013-135386 A | 7/2013 |
| KR | 10-2010-0105449 A | 9/2010 |
| KR | 10-2010-0116118 A | 10/2010 |
| KR | 10-2010-0126509 A | 12/2010 |
| KR | 10-2010-0133477 A | 12/2010 |
| KR | 10-2010-0137531 A | 12/2010 |
| KR | 10-2011-0000479 A | 1/2011 |
| KR | 10-2011-0084965 A | 7/2011 |
| KR | 10-2011-0085441 A | 7/2011 |
| KR | 10-2011-0091305 A | 8/2011 |
| KR | 10-2011-0093642 A | 8/2011 |
| KR | 10-2011-0109992 A | 10/2011 |
| KR | 10-2011-0134305 A | 12/2011 |
| KR | 10-2011-0135863 A | 12/2011 |
| RU | 2 262 811 C2 | 10/2005 |
| RU | 2411697 C2 | 2/2011 |
| RU | 2426251 C2 | 8/2011 |
| WO | 1998-001004 A2 | 1/1998 |
| WO | 1998-026625 A2 | 6/1998 |
| WO | 2008/106301 A1 | 9/2008 |
| WO | 2008-137354 A1 | 11/2008 |
| WO | 2010/018801 A1 | 2/2010 |
| WO | 2010-121662 A1 | 10/2010 |
| WO | 2010-124228 A2 | 10/2010 |
| WO | 2011/055999 A2 | 5/2011 |
| WO | 2011/063244 A2 | 5/2011 |
| WO | 2011-085802 A1 | 7/2011 |
| WO | 2011-093666 A2 | 8/2011 |
| WO | 2011-099725 A2 | 8/2011 |
| WO | 2011-133934 A1 | 10/2011 |
| WO | 2011-154761 A1 | 12/2011 |
| WO | 2011-157292 A1 | 12/2011 |
| WO | 2012-008691 A2 | 1/2012 |
| WO | 2012/141483 A2 | 10/2012 |
| WO | 2013/051836 A1 | 4/2013 |

(56) References Cited

FOREIGN PATENT DOCUMENTS

| WO | 2013/051912 A2 | 4/2013 |
|----|----------------|--------|
| WO | 2013/065995 A1 | 5/2013 |

OTHER PUBLICATIONS

Telcoloewe, "PDP context vs. EPS Bearer", Jan. 28, 2010. https://telcoloewe.wordpress.com/2010/01/28/pdp-context-vs-eps-bearer/ https://telcoloewe.wordpress.com/2010/01/28/pdp-context-vs-eps-bearer/.*

"3rd Generation Partnership Project; Technical Specification Group Radio Access Network Extending 850MHz Study Item Technical Release (Release 9)", GPP TR 37.806, V1.10.0, R4-114382, Aug. 17, 2011.

Ericsson, "Multiple Frequency Band Indicators Per Cell", 3GPP TSG-RAN WG2 #75, R2-114299, Aug. 22-26, 2011, Athens Greece.

Huawei et al., "The MDT applicability of EPLMN", 3GPP Change Request, 3GPP TSG-WG2 Meeting #75, R2-114011, Aug. 22-26, 2011, Athens, Greece.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320, V10.4.0, Dec. 2011.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331 V10.2.0, Jun. 2011.

Huawei et al., "Enabling SMS for PS-only", SA WG2 Meeting #87, S2-114586, Oct. 10-14, 2011, pp. 1-2, Jeju, Korea.

"3rd Generation Partnership Project; Technical Specification Group Services and System Aspects; Circuit Switched (CS) fallback in Evolved Packet System (EPS); Stage 2 (Release 10)", 3GPP TS 23.272 V110.5.0 (Sep. 2011), Aug. 24, 2011, pp. 1-79.

Alcatel-Lucent et al., "RA procedure on SCell", TSG-RAN WG2#77, R2-120603, Feb. 6-10, 2012, pp. 1-5, Dresden, Germany.

"3rd Generation Partnership Project; Technical Specification Group Radio Access Network; Study on Minimization of drive-tests in Next Generation Networks; (Release 9)", 3GPP TR 36.805 V9.00 (Dec. 2009), Jan. 5, 2010, pp. 2-27.

Ericsson et al., "Accessibility measurements for MDT", 3GPP TSG-RAN WG2 #76, R2-116148, Oct. 14-18, 2011, pp. 2-4, San Francisco, CA, USA.

Alcatel-Lucent, "VLR SGs paging retry", SA WG2 Meeting #87, S2-114636 (revision of S2-114578), Oct. 10-14, 2011, pp. 2-6, Jeju, South Korea.

"3rd Generation Partnership Project; Technical Specification Group Services and System Aspects; Service accessibility; (Release 11)", 3GPP TS 22.011 V11.2.0 (Dec. 2011), Dec. 31, 20011, pp. 1-26.

Huawei et al.,"General consideration of EAB in LTE", 3GPP TSG-RAN WG2 Meeting #75, R2-113988, Aug. 22-26, 2011, pp. 1-3, Athens, Greece.

Pantech, "IDC trigger procedure", 3GPP TSG-RAN WG2 Meeting #77, R2-120664, Nov. 14-18, 2011, pp. 1-5, Dresden, Germany.

Motorola, "Solution for Extra Low Power Consumption & Time Controlled", 3GPP TSG SA WG2 Meeting #78, TD S2-101215, Feb. 22-26, 2010, pp. 1-3, San Francisco, USA.

ZTE, "Some small corrections to 36.300", 3GPP TSG-RAN WG2 Meeting #74, R2-113388, May 9-13, 2011, pp. 1-9, Barcelona, Spain.

Samsung, "RRC TP on CA changes regarding Connection control", 3GPP TSG-RAN2#70 bis meeting, R2-103802, Jun. 28-Jul. 2, 2010, pp. 1-19, Stockholm, Sweden.

3rd Generation Partnership Project; Technical Specification Group Radio Access Network; Study on Minimization of drive-tests in Next Generation Networks; (Release 9), 3GPP TR 36.805 V9.0.0 (Dec. 2009), Dec. 2009, pp. 1-24.

23.1 RRC Connection Establishment, www.lte-bullets.com, Aug. 12, 2011.

Nokia Corporation et al., RACH and carrier aggregation, 3GPP TSG-RAN WG2 Meeting #68, R2-096844, Nov. 9-13, 2009, Jeju, South Korea.

Asustek, Issues of Random Access procedure on SCell, 3GPP TSG-RAN WG2 Meeting #74, R2-112922, May 9-13, 2011, Barcelona, Spain.

Itri, Considerations on Random Access on SCell, 3GPP TSG RAN WG2 #74, R2-113192, May 9-13, 2011, Barcelona, Spain.

New Postcom, Consideration on RA response window size for SCell, 3GPP TSG RAN WG2 Meeting #79, R2-123485, Aug. 13-17, 2012, Qingdao, China.

Qualcomm Incorporated, Separate UE capability for FDD and TDD, 3GPP TSG RAN WG2 #74, R2-113059, May 3-13, 2011.

Qualcomm Incorporated, UE capability for FDD and TDD, 3GPP TSG RAN WG2 #73bis, R2-111868, Apr. 11-15, 2011.

Qualcomm Incorporated, Introduction of UE capability for handover between FDD and TDD, 3GPP TSG RAN WG2 #74, R2-113056, May 9-13, 2011.

Samsung; Discussion on FGI bit handling for FDD/TDD dual mode UE; 3GPP TSG-RAN2 #75 meeting, Aug. 22-26, 2011 (electronically published Aug. 16, 2011).

Clearwire; E-UTRA capability handling for dual mode UEs (FDD/TDD); 3GPP TSG-RAN Meeting #54; Berlin, Germany; Dec. 6-9, 2011; RP111618.

LG Electronics Inc; FGI Bit 25; 3GPP TSG-RAN WG2 #74; R2-113277; Barcelona, Spain; May 9-14, 2011.

3GPP; 3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331; V10.2.0; Jun. 24, 2011.

Clearwire; Capability handling for dual mode UEs (FDD/TDD); 3GPP TSG-RAN Working Group Meeting #75bis; Ahuhai, China; Oct. 10-14, 2011; R2-115468 with a publicly available date of Oct. 7, 2011.

Samsung; Report [75#32] FGI bit handling for FDD/TDD dual mode UE; 3GPP TSG-RAN2 #75bis meeting; Oct. 10-14, 2011; Zhuhai, China; Tdoc R2-115034.

3GPP TS 26.346 v10.0.0; Valbonne, France; Mar. 2011.

Qualcommm Incorprated, Verizon Wireless, "System time and leap seconds", 3GPP TSG-CT WG1 # 79 C1-122988; Chicago, US; Jul. 30, 2012.

Qualcomm Incorporated, "MBMS Assistance Information for idle and connected mode", 3GPP TSG-RAN WG2#77 R2-120285; Dresden, Germany; Jan. 31, 2012.

Qualcomm Incorporated, Verizon Wireless, Telefon AB LM Ericsson, ST-Ericsson SA, Alcatel-Lucent, "USD Signaling of Frequency Information", 3GPP TSG-SA WG4#69 S4-120602; Erlagen, Germany; May 21, 2012.

Verizon Wireless, Alcatel-Lucent, Ericsson, ST-Ericsson, Motorola Mobility, Qualcomm Incorporated, "MBMS Multibands Cell Selection and Reselection", 3GPP TSG-RAN WG2#77 R2-120841; Dresden, DE; Feb. 6, 2012.

Samsung, "Introducing MBMS enhancements for REL-11", 3GPP TSG-RAN WG2#79 R2-123859; Qingdao, PR of China; Aug. 12, 2012.

"LTE; Evolved Universal Terrestrial Radio Access (E-UTRA) and Evolved Packet Core (EPC); Common test environments for User Equipment (UE) conformance testing (3GPP TS 36.508 version 9.5.0 Release 9)", Technical Specification, European Telecommunications Standards Institute (ETSI), 650, XP014066447; Cedex, France; Jul. 2011.

Panasonic et al: "CQI/ SRS/ PMI/ RI Transmission during active time", 3GPP Draft; R2-086318, 3rd Generation Partnership Project (3GPP), Mobile Competence Centre; 650, Route Des Lucioles; F-06921 Sophia-Antipolis Cedex; France, No. Prague, Czech Republic, XP050321306; Prague, Czech Republic; Nov. 10, 2008.

Samsung: "Discussion on CQI/ SRS Transmission during DRX", 3GPP Draft; R2-114180 Continuing CQI Temporary, 3rd Generation Partnership Project (3GPP), Mobile Competence Centre; 650,

(56) References Cited

OTHER PUBLICATIONS

Route Des Lucioles; F-06921 Sophia-Antipolis Cedex; France, vol. Ran WG2, No. Athens, Greece; XP050539989; Athens, Greece; Aug. 22, 2011.
Ericsson, ST-Ericsson, Extended access barring for MTC devices[online], 3GPP TSG-RAN WG2#74 R2-113030; Barcelona, Spain; May 9, 2011.
LG Electronics Inc., Further Discussion on EAB[online], 3GPP TSG-RAN WG2#74 R2-113339; Barcelona, Spain; May 3, 2011.
3GPP TS 22.011 V11.0.0; Valbonne, France; Jun. 2011.
Intel Corporation, Additional requirements on EAB for RAN overload protection[online], 3GPP TSG-SA WG1#54 S1-111152; Xi'an, China; May 9, 2011.
"3rd Generation Partnership Project; Technical Specification Group Services and System Aspects; Service accessibility (Release 10)", XP050914344; Valbonne, France; Mar. 2011.
Catt; Analysis on FGIs for 3/4-mode UE; 3GPP TSG RAN WG2 Meeting #77bis; R2-121173; Mar. 26-30, 2012; Jeju, KR.
Catt; Corrections and Clarifications on UTRA related FGIs; 3GPP TSG-RAN2 Meeting #77bis; R2-121549; Mar. 26-30, 2012; Jeju, KR.
Catt; Corrections and Clarifications on UTRA related FGIs; 3GPP TSG-RAN2 Meeting #77bis; R2-121551; Mar. 26-30, 2012; Jeju, KR.
InterDigital Communications, Handling of SCell Activation/Deactivation RF Retuning Interruptions, 3GPP TSG RAN WG2 #78, R2-122289, May 21-25, 2012, Prague, Czech Republic.
Renesas Mobile Europe Ltd, Considerations on retuning interruptions, 3GPP TSG-RAN WG4 Meeting #63, R4-123056, May 21-25, 2012, Prague, Czech Republic.
3GPP; 3rd Generation Partnership Project; Technical Specification Group Radio Access Network; Evolved Universal Terrestrial Radio Access (E-UTRA); User Equipment (UE) radio transmission and reception (Release 10); 3GPP TS 36.101; V10.3.0; Jun. 2011; Valbonne, France.
Interdigital; Rach with Carrier Aggregation; 3GPP TSG-RAN WG2 #69bis; Tdoc R2-102132; Apr. 12-16, 2010; Beijing, CN.
3GPP; 3rd Generation Partnership Project; Technical Specification Group Radio Access Network; Evolved Universal Terrestrial Radio Access (E-UTRA); Medium Access Control (MAC) protocol specification (Release 11); 3GPP TS 36.321; V11.0.0; Sep. 2012; Valbonne, France.
Ericsson et al.; Multiple frequency band indicators per cell; 3GPP TSG-RAN2 Meeting #75; R2-114301; Aug. 22-26, 2011; Athens, Greece.
3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321;V.10.0.0; Dec. 2010; Valbonne, FR.
Fujitsu; Discussion n PHR for SCell in Rel-11; 3GPP TSG-RAN WG2 Meeting #75; R2-114485; Aug. 22-26, 2011; Athens, Greece.
Interdigital Communications; Completion of Initial Timing Alignment Procedure for SCells; 3GPP TSG-RAN WG2 #75bis; Tdoc R2-115408; Oct. 10-14, 2011; Zhuhai, China.
Samsung; PS-only high level function description; 3GPP TSG SA WG2 Meeting #89; TD S2-110485; Feb. 6-10, 2012; Vancouver, Canada.
Zte; Consideration on SCell RLM in Carrier Aggregation; 3GPP TSG-RAN WG4 meeting AH#4; R4-103527; Oct. 11-15, 2010; Xi'an, China.

* cited by examiner

METHOD AND APPARATUS FOR TRANSMITTING AND RECEIVING DATA BY USING PLURALITY OF CARRIERS IN MOBILE COMMUNICATION SYSTEMS

CROSS-REFERENCE TO RELATED APPLICATION(S)

This application is a continuation application of prior application Ser. No. 14/364,190, filed on Jun. 10, 2014, which was the National Stage of an International application filed on Jan. 28, 2013 and assigned application number PCT/KR2013/000669, which claimed the benefit under 35 U.S.C. § 119(e) of a U.S. Provisional application filed on Jan. 27, 2012 in the U.S. Patent and Trademark Office and assigned Ser. No. 61/591,385, of a U.S. Provisional application filed on Jan. 30, 2012 in the U.S. Patent and Trademark Office and assigned Ser. No. 61/592,568, of a U.S. Provisional application filed on Feb. 6, 2012 and assigned Ser. No. 61/595,646, of a U.S. Provisional application filed on Feb. 17, 2012 in the U.S. Patent and Trademark Office and assigned Ser. No. 61/600,179, and of a U.S. Provisional application filed on May 21, 2012 in the U.S. Patent and Trademark Office and assigned Ser. No. 61/649,910, the entire disclosure of each of which is hereby incorporated by reference.

TECHNICAL FIELD

The present invention relates to a method and apparatus for communicating data using a plurality of carriers in a mobile communication system.

BACKGROUND ART

Mobile communication systems were developed to provide the subscribers with voice communication services on the move. With the rapid advance of technologies, the mobile communication systems have evolved to support high speed data communication services beyond the early voice-oriented services.

Recently, standardization for a Long Term Evolution (LTE) system, as one of the next-generation mobile communication systems, is underway in the 3rd Generation Partnership Project (3GPP). LTE is a technology for realizing high-speed packet-based communications with the data rate of up to 100 Mbps, which is higher than the currently available data rate, and its standardization is almost complete.

Recent studies are focused on the LTE-Advanced (LTE-A) for improving data rate with the adaptation of several new techniques to legacy LTE system. One of the representative technologies is Carrier Aggregation. Carrier aggregation is enabling terminal to use multiple downlink and uplink carriers unlike the conventional system using one downlink carrier and one uplink carrier.

Recently, one of the main issues of LTE-A is overlapping a plurality of small cells and one macro cell in the geographically same area. Through this, it is possible to obtain so-called cell splitting gain. In order to improve the throughput using the small cells, it is necessary to aggregate the small cells for the terminal entering the small cell area as quick as possible. In the case of using the current measurement method, the terminal has to continue measurement for the small cells, resulting in significant battery power consumption.

DISCLOSURE OF INVENTION

Technical Problem

The present invention has been conceived to solve the above problem and aims to provide a method and apparatus for detecting the small cell quickly while minimizing battery power consumption in a network where the small cells and macro cell operating on different frequencies are overlapped.

Solution to Problem

In accordance with an aspect of the present invention, a data communication method of a base station of a wireless communication system includes receiving a capability report from a terminal, determining whether serving cell add is necessary, transmitting, when the serving cell add is necessary, a cell identity signal reception request to at least one other base station based on the received capability report, and transmitting a cell identity signal transmission request to the terminal.

In accordance with another aspect of the present invention, a data communication method of a terminal in a wireless communication system includes transmitting a capability report of a terminal to a base station, receiving a cell identity signal transmission request determined based on the terminal capability report from the base station, and transmitting a cell identity signal to other base stations based on the cell identity signal transmission request.

In accordance with another aspect of the present invention, a base station communicating data in a wireless communication system includes a transceiver which receives a capability report from a terminal and a controller which determines necessity of adding a serving cell, wherein the transceiver transmits, when the serving cell add is necessary, a cell identity signal reception request to at least one other base station based on the received capability report and transmits a cell identity signal transmission request to the terminal.

In accordance with still another aspect of the present invention, a terminal communicating data in a wireless communication system includes a transceiver which transmit a capability report of a terminal to a base station and receives a cell identity signal transmission request determined based on the terminal capability report from the base station and a controller which controls the transceiver to transmit a cell identity signal to other base stations based on the cell identity signal transmission request.

Advantageous Effects of Invention

The data transmission and reception method of the present invention is advantageous in detecting small cell quickly with minimum battery power consumption of the terminal in a network where the small and macro cells operating on different frequency bands are overlapped.

MODE FOR THE INVENTION

Detailed description of well-known functions and structures incorporated herein may be omitted to avoid obscuring the subject matter of the present invention. This aims to omit unnecessary description so as to make the subject matter of the present invention clear.

Exemplary embodiments of the present invention are described with reference to the accompanying drawings in detail. Prior to the explanation of the present invention, the LTE system and carrier aggregation are described briefly.

Figure 1:
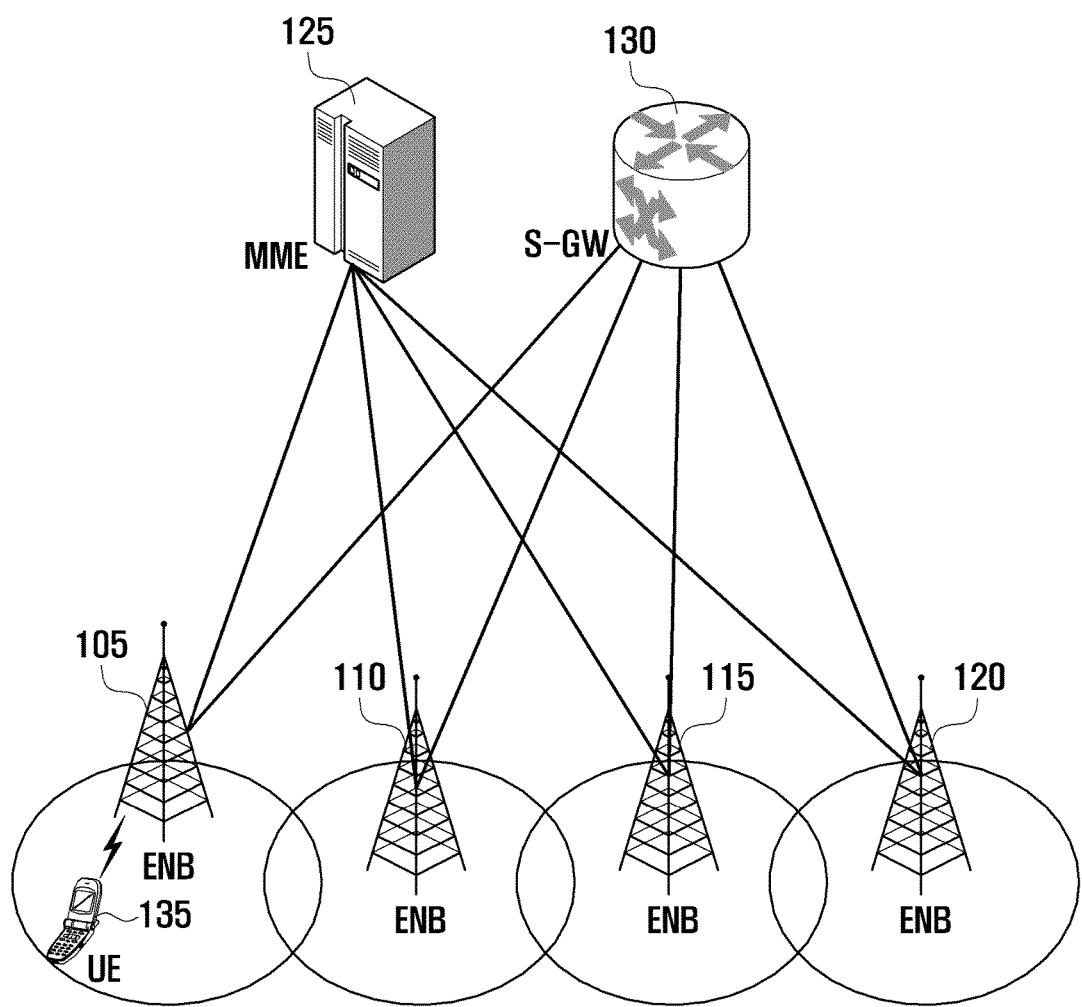
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE to establish a radio channel and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology on the bandwidth of 20 MHz. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
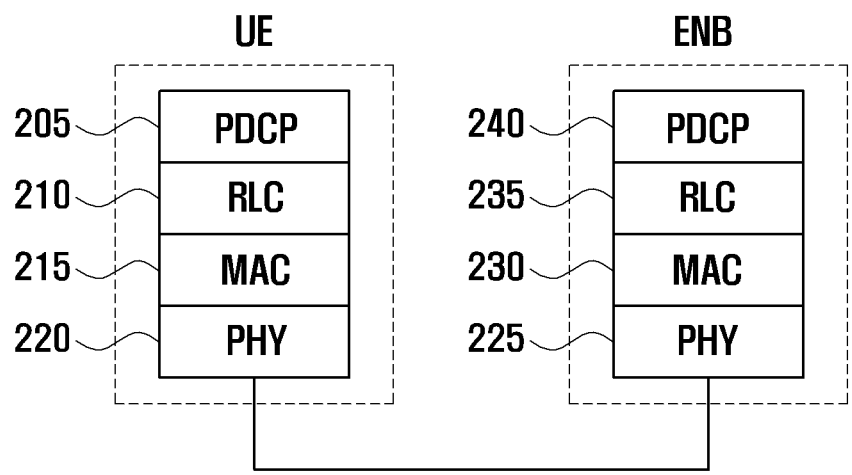
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
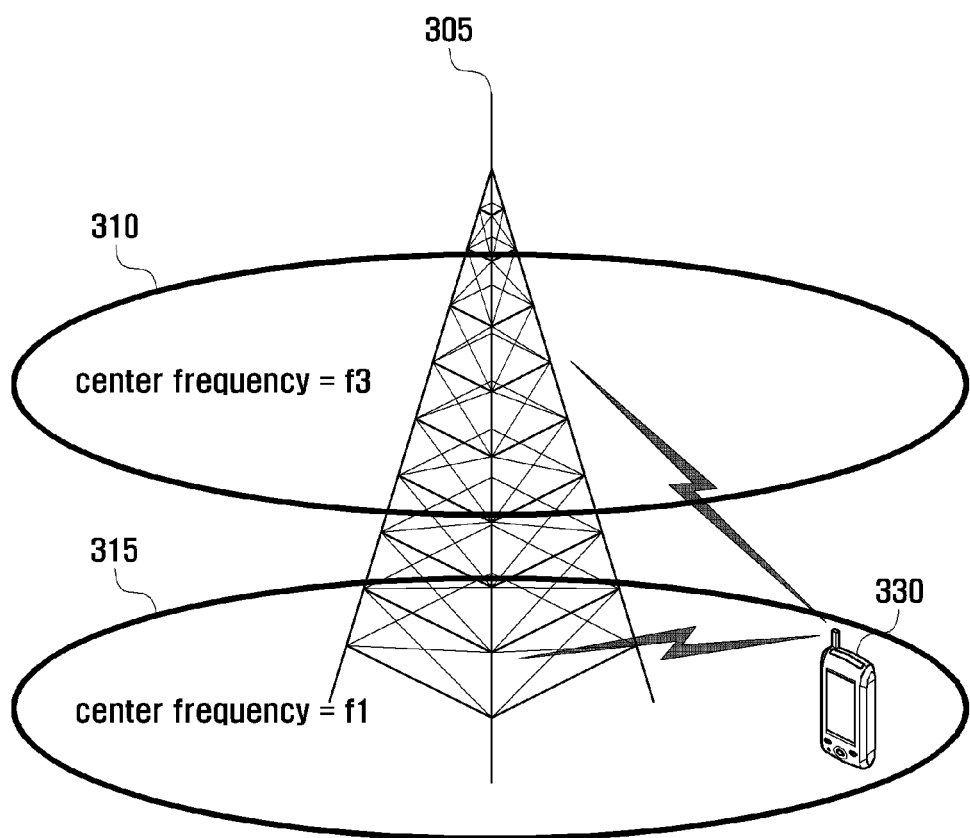
FIG. 3 is a diagram for explaining carrier aggregation of the UE.

FIG. 3 is a diagram for explaining carrier aggregation of the UE.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. The cell areas formed by the carriers may similar to each other, but one frequency carrier may form a macro cell covering relatively large area while another frequency carrier forms a pico cell covering relatively small are such as hot-spot and, at this time, it is also possible to aggregate the macro and small cells for the UE.

Figure 4:
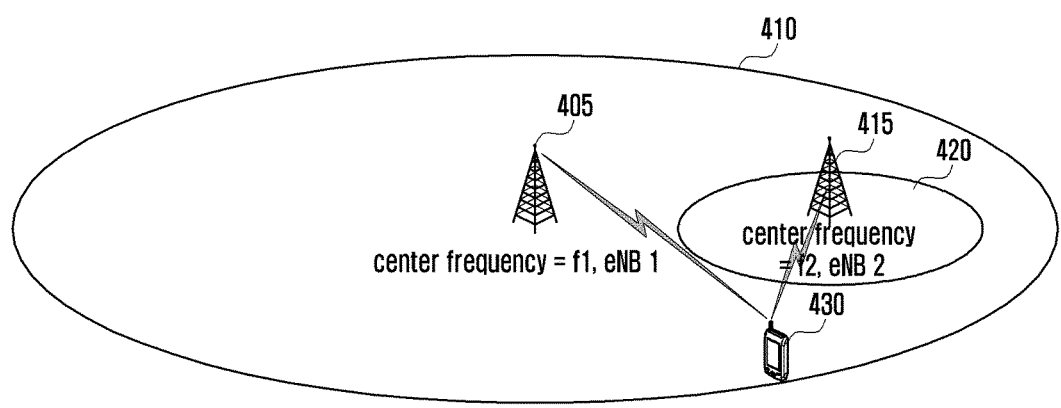
FIG. 4 is a diagram illustrating a situation in which small and macro cells are overlapped.

Referring to FIG. 4, when the eNB 1 405 manages the macro cell 410 operating on the carrier with the center frequency f1 and the eNB 2 415 manages the small cell 420 operating on the carrier with the center frequency f2, the UE 430 may aggregate the two carriers to transmit/receive data using both the macro and small cells.

The small cell which has very small coverage as compared to the macro cell is likely to maintain the channel condition with the UE and enjoy the cell splitting gain. Accordingly, the UE is likely to enjoy very high data rate and throughput in the small cell as compared to the macro cell. Accordingly, it is necessary, when the UE enters the small cell area, to detect the entry of the UE into the small cell area and aggregate the small cell as a secondary cell.

The terms to be used in the following descriptions are described hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. In the present invention, carrier aggregation can be expressed as 'a plurality of serving cells is configured', the terms 'primary serving cell (hereinafter, PCell), 'secondary serving cell (hereinafter, SCell), and activated serving cell are used. These terms follow the meanings used in the LTE mobile communication system and details are specified in TS 36.33 and TS 36.321. In the present invention, the term 'small cell' denotes the cell having the coverage much smaller than the normal cell (macro cell) of cellular network.

First Embodiment

The first embodiment of the present invention is comprised of configuring a small cell as the SCell to the UE with a very demanding amount data or instructing the UE established a connection on the frequency different form that of the small cell to perform uplink transmission on the frequency of the small cell for handover to the small cell, performing uplink transmission at a predetermined strength using predetermined frequency and time resource on the frequency, reporting, at the small cell device received the uplink transmission of the UE, this to the macro cell eNB, and determining, at the macro cell eNB, whether to configure the small cell as an SCell to the UE based thereon or perform handover of the UE to the small cell.

Figure 5:
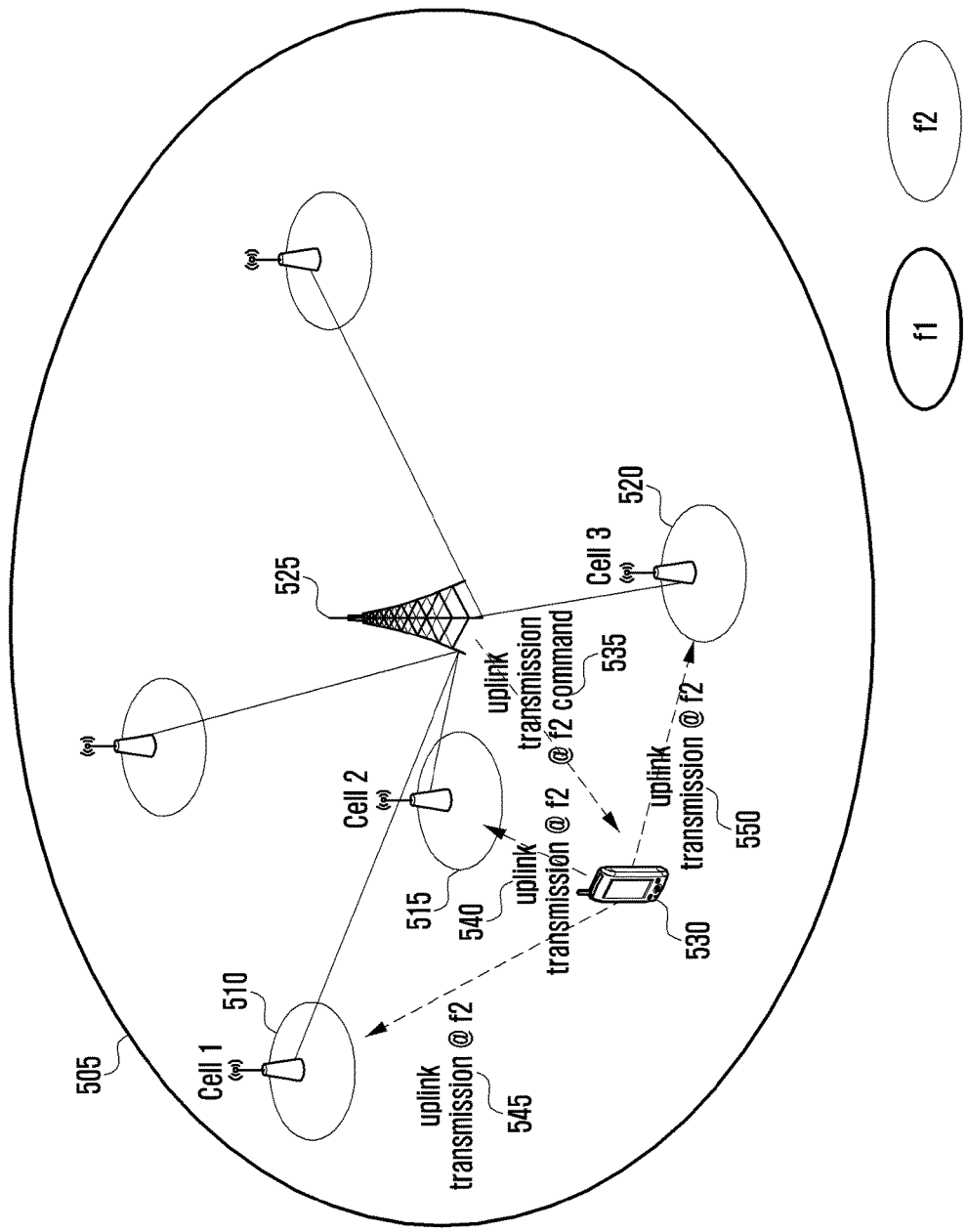
FIG. 5 is a diagram illustrating a procedure of detecting small cells around UE using small cell identification signal.

The overall operation of the first embodiment is described briefly with reference to FIG. 5.

The UE 530 receives uplink signals and transmits downlink signals through macro cell operating in f1. At this time, the UE configure uplink transmission power in consideration of the pathloss and the accumulated Transmission Power Command (TPC) in order for the macro cell eNB 525 to receive the signal. The macro eNB 525 detects the traffic of the UE 530 at a certain time point. For example, it is possible to determine whether the traffic increases based on the change of the data amount stored in the downlink buffer to the UE 530 and the change in buffer state of the UE 530 which is reported through the buffer state report. The macro eNB 525 determines that it is preferred to add a small cell for the UE 530 or have the UE 530 perform handover to the small cell and transmits the control information indicating to perform uplink transmission using a predetermined time resource through a predetermined frequency, e.g. f2, in order to determine whether there is any small cell around the UE 530 as denoted by reference number 535.

The UE 530 sets the uplink transmission power to a predetermined level such that only the nearby small cells receive the uplink signal. The uplink transmission power may be calculated by applying the pathloss value transmitted by the eNB or a predetermined uplink transmission power value informed by the eNB. Depending on the embodiment, the uplink power and frequency may be determined based on the control signal received as denoted by reference number 535.

In the case that there are small cell 1 510, small cell 2 515, and small cell 3 520 around the UE 530, if the uplink signal transmitted by the UE 530 is received by the small cell 2 515 and the small cell 3 520 and if the received signal strength at the small cell 2 515 is greater than the received signal strength at the small cell 3 520, the macro eNB may initiate the procedure of configuring the small cell 2 515 to the UE.

Or, the macro eNB 525 may check only that there is any small cell available around the UE 530, configure measurement for f2 to the UE 530, and configure, if the UE 530 reports the measurement result on f2, the most suitable small cell based on the measurement result.

In an embodiment, the UE 530 perform uplink transmission on f2 in the small cell 1 510, small cell 2 515, and small cell 3 520. Depending on the result of the uplink transmission of the UE 530, the macro cell eNB 525 may select a small cell around. In an embodiment, f1 and f2 may be determined variably depending on the configuration.

In this way, it is possible to reduce battery power consumption of the terminal 530 by minimizing measurement to the frequencies other than the current serving frequency.

Figure 6:
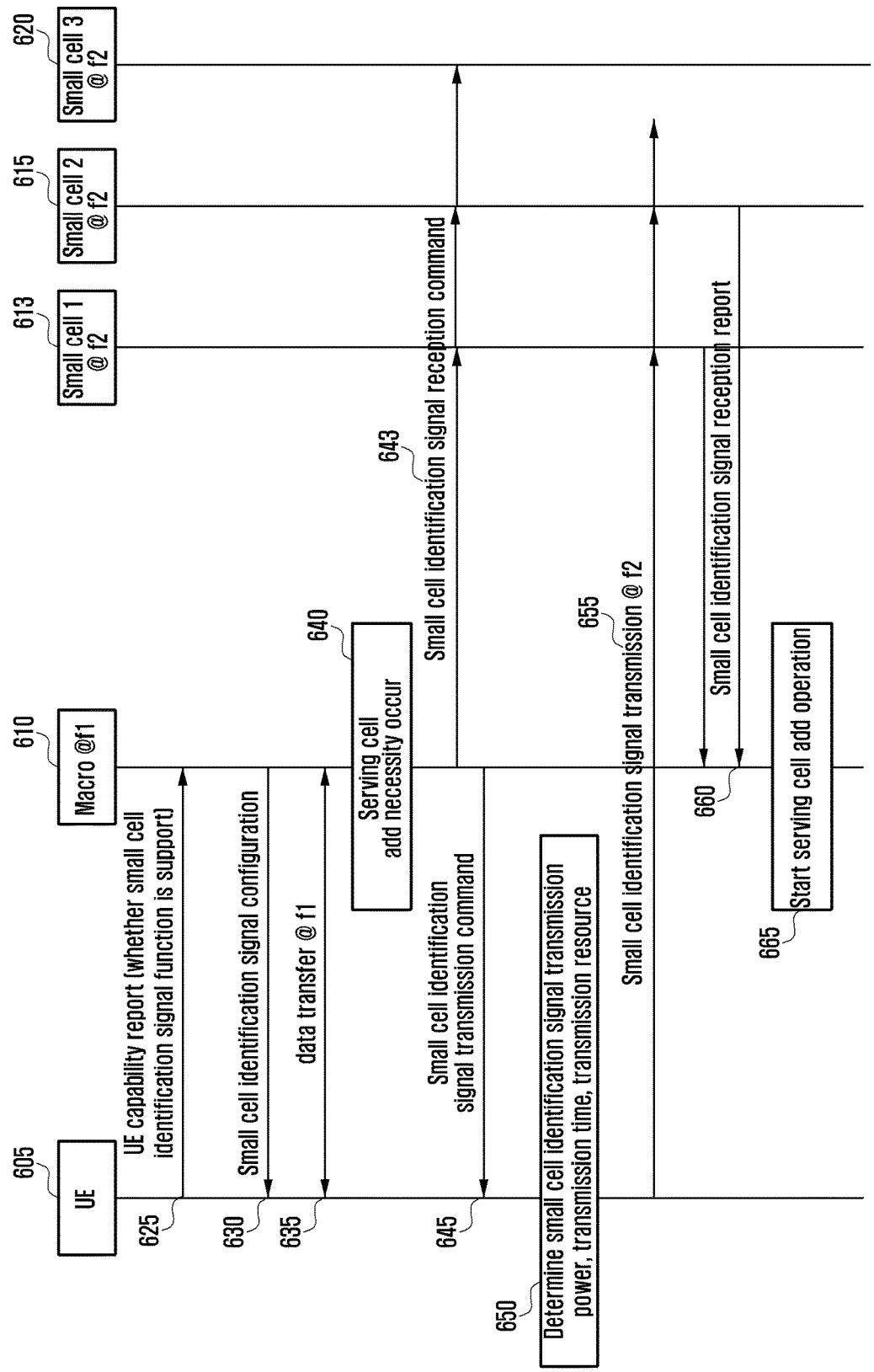
FIG. 6 is a diagram illustrating the overall operation of the first embodiment.

FIG. 6 shows the operations of the UE and the eNB.

In the following description, the terms 'macro cell' and 'macro cell eNB' are used interchangeably.

The UE 605 establishes an RRC connection with the macro cell operating on the frequency f1 and then report the UE capability to the eNB 610 according to the instruction of the eNB 610 at step 625. The UE capability report includes the information on various capabilities of the UE 605. For example, at least one of the information on the carrier aggregation capability or antenna configuration, buffer size of the UE, and maximum data rate of the UE is reported. Also, the information on whether the UE 605 supports small cell identification signal transmission function is reported. The signal including the information for use in checking the location of the UE 605 may be reported to the eNB 610.

The eNB 610 determines the communication scheme of the UE 650 (e.g. MIMO configuration, carrier aggregation configuration, and transmission mode configuration) by referencing the reported UE capability.

If there is any small cell deployed in the area controlled by the eNB 610 and if the UE 605 is the UE having very demanding data amount, the eNB sends the UE the small cell identification signal configuration information at step 630. According to an embodiment, the small cell identification signal configuration information may be included in a predetermined RRC control message, e.g. RRC CONNECTION RECONFIGURATION message, and may include at least one of the following informations.

1. Small cell identification signal transmission power configuration information;
2. Small cell identification signal transmission frequency information;
3. Small cell identification signal transmission resource information The above informations are described in more detail hereinafter.

The UE 605 determines the uplink transmission power in consideration of the pathloss of the serving cell and accumulation value of the TPC received for the serving cell in order for the serving cell eNB to receive the uplink signal of the UE. Since the small cell identification signal is the signal for use in determining whether the UE is in a certain small cell are or approaches the area, it is necessary to determine the transmission power in a method different from the normal transmission power calculation. Preferably, it is required that when the UE transmits the small cell identification signal, only the small cells of which distance from the UE is equal to or less than an predetermined threshold can receive the signal correctly. In the case of considering the pathloss of the serving cell or TPC accumulation value, the transmission power is configured in association with the serving cell and thus the intended goal cannot be achieved. In the present invention, if the uplink transmission signal is the small cell identification signal, the UE 605 may use the pathloss and TPC value predetermined by the eNB 610 other than the pathloss and TPC value of the serving cell. Or, the eNB 610 may recommend the transmission power value to be applied for transmitting the small cell identification signal and, this is referred to as small cell identification signal transmission power configuration information.

1. Small cell identification signal transmission power configuration information (1) Explicitly/directly indicated small cell identification signal transmission power value (e.g. x dBM);

(2) Pathloss (PLc) and TPC accumulation value (fc) to be applied to the following equation. The UE configures the small cell identification signal transmission power by applying the signaled parameters to the following equation.

$$P_{PUSCH,c}(i) = \min\{P_{CMAX,c}(i), P_{O\_PUSCH,c}(1) + \alpha_c(1) \cdot PL_c + f_c(i)\} \quad (1)$$

Equation (1) is specified in 36.213.

Typically, the uplink transmission of the UE is performed on the current operation frequency (or serving frequency). Since the small cell identification signal of the present invention is a one-off signal transmitted on the non-serving frequency other than the current serving frequency, it is necessary to notify the uplink frequency carrying the small cell identification signal which is referred to as small cell identification signal transmission frequency information.

1. small cell identification signal transmission frequency (1) UL ARFCN (or E-ARFCN): a kind of index indicating frequency for small cell identification signal transmission of the UE. ARFCN and E-ARFCN are specified in 36.101.

(2) Measurement Object ID: identifier of Measurement Object associated with frequency for small cell identification signal transmission of UE. The Measurement Object is specified in 36.331.

The small cell identification signal may be transmitted using Physical Uplink Shared Channel (PUSCH) transmission resource but, by the characteristic of the signal, it may be considered to transmit in the form of PRACH preamble containing simple information. The information associated with the transmission resource for transmitting the small cell identification signal may include the followings.

1. Small cell identification signal transmission resource information (1) If being transmitted in the form of PRACH preamble, preamble transmission resource and transmission period indication information. For example, prach-ConfigIndex, ra-PreambleIndex, ra-PRACH-MaskIndex, etc. The prach-ConfigIndex is the information indicating the preamble transmission frequency resource and transmission period in the form of an index, ra-PreambleIndex is an integer in the range of 0~63 as the information indicating the type of the preamble to be transmitted, and ra-PRACH-MaskIndex indicates the frequency resource and time period to be used among the transmission frequency resources and the transmission periods indicated by the prach-ConfigIndex. Detailed description is specified in 36.331.

(2) If being transmitted on PUCCH transmission resource, information indicating the Physical Resource Block (PRB) index information and transmission period indication information. The transmission time period indication information may be the information indicating the time interval for transmitting the small cell identification signal after the receipt of 'small cell identification signal transmission command.'

Some of the above informations, e.g. E-ARFCN and ra-PreambleIndex may be transmitted to the UE 605 through the small cell identification signal transmission command at step 645.

The UE 605 and the eNB 610 communicate data through the macro cell at step 635. At a certain time point, the macro eNB 610 recognizes the necessity of configuring an additional serving cell, particularly a small cell, to the UE 605 at step 640. For example, this may be the situation where the downlink data or uplink data of the UE 605 increases. In order to determine whether it is possible to configure a small cell to the UE 605, i.e. whether the UE 650 is in a small cell area, the macro eNB 610 instructs the small cells expected being deployed around the UE 650, e.g. small cell 1 613, small cell 2 615, and small cell 3 620, to receive the small cell identification signal at step 643 and commands the UE to transmit the small cell identification signal at step 645. The small cell identification signal reception command includes the information on the frequency resource and time period for the UE 605 to transmit the small cell identification signal and preamble information. The control devices of the small cells instructed to receive the small cell identification signal monitors the indicated frequency and time resources to receive the small cell identification signal. The small cell identification signal transmission command may be transmitted through Physical Downlink Control Channel (PDCCH). Particularly, a format similar to the PDCCH order can be used. The PDCCH order is a command instructing to initiate random access procedure in a certain serving cell and specified in 36.211. In the present invention, the small cell identification signal transmission command also use the format similar to the PDCCH order, and the formats of PDCCH order and small cell identification signal transmission command are described comparatively in the following.

The PDCCH order and small cell identification signal transmission command are transmitted in DCI format 1A, and CRC is scrambled with C-RNTI of the corresponding UE. The individual fields may be coded as follows.

TABLE 1

| | | Field coding | |
|---|---|---|---|
| PDCCH field name | Size (bit) | PDCCH order | Small cell identification command |
| Flag for format 0/ format 1A differentiation | 1 | 1 | 1 |
| Localized/Distributed VRB assignment flag | 1 | 0 | 0 |
| RB assignment | 5~13 | all 1 | all 1 |
| Preamble index | 6 | Preamble index for UE to use in random access procedure | Preamble index for UE to use in small cell identification signal transmission |
| PRACH mask index | 4 | PRACH mask index for use in random access procedure | Other information |
| remaining | 3 or 4 | all 0 | all 1 |

Since the PRACH mask index is not so much necessary in the small cell identification signal command, it may be possible to include at least one of the following other informations instead of PRACH mask index.

1. Preamble transmission frequency information: If it is provided in the small cell identification signal command instead of the operation of step 630, the frequency information may be included in other informations.

2. Preamble transmission power adjustment information: Offset information for the transmission power value provided at step 630. For example, if the small cell identification signal has transmitted at transmission power of x dBm and if y is signaled as other information, the transmission power of the small cell identification signal is set to (x+z) dBm. At this time, y is a kind of index, and z is offset indicated actually by the index.

3. Preamble transmission time period indication information: Information indicating the subframe or time interval of ms for transmitting the small cell identification signal when the subframe carrying the small cell identification signal command is n. Typically, the PDCCH order indicates the preamble transmission after +6 subframes, but the small cell identification signal may require a margin of 6 or more frames because it is transmitted on a frequency different from the current serving frequency. The preamble transmission period indication information may be used for configuring the small cell identification signal transmission time point flexibly by taking notice of this. In another approach, it is possible to fix the difference between the subframe in which the small cell identification signal command is received and the subframe in which the small cell identification signal is transmitted to a value different from 6 or configure the difference at step 630.

The functional difference between PDCCH order and small cell identification signal command are described comparatively in table 2.

TABLE 2

| | PDCCH order | Small cell identification signal transmission command |
|---|---|---|
| Role | Command to initiate random access in predetermined serving cell | Command to transmit UL signal n times using predetermined transmission resource on predetermined frequency (n may be 1). The frequency is a frequency different from the uplink frequency corresponding to the downlink on which the small cell identification signal transmission command is received. Or, the frequency is a frequency different from the current serving frequency. |
| UL Tx power calculation | Calculate in consideration of pathloss of serving cell similar to normal UL transmission power determination | Calculate by applying other parameters provided by eNB in a separate control signal without consideration of pathloss of the serving cell. |
| Tx period determination | Determine transmission period using frame boundary and System Frame Number (SFN) of serving cell in which random access is to be performed | Determine the transmission duration using the frame boundary and SFN of a predetermined serving cell (e.g. serving cell in which small cell identification signal transmission command is received) other than the cell in which the small cell identification signal is to be transmitted. |

At step 650, the UE 650 determines the small cell identification signal transmission frequency, small cell identification signal transmission power, small cell identification signal transmission frequency, and small cell identification transmission period using the information indicated in the small cell identification signal transmission command.

At step 655, the UE 650 transmits the small cell identification signal. In an embodiment, the small cell identification signal may be transmitted based on the information received by the UE 650 at step 645 through the frequency of f2.

If the small cell identification signal transmitted by the UE 605 is received, the control device of the corresponding small cell generates and sends a small cell identification signal reception report message to the macro eNB 610 at step 660. The small cell identification signal reception report message may include at least one of received signal strength of the received small cell identification signal, preamble index, and received time.

If the small cell identification signal reception report message is received from one or more small cells, the macro eNB 610 determines the possibility of adding the small cell to the UE 605 and initiate serving cell add operation at step 665. The serving cell add operation is the operation of instructing the UE to perform measurement to the corresponding small cell and, if the UE reports the measurement result indicating good channel condition of the small cell, configuring the small cell to the UE 605 or performing handover of the UE 605 to the small cell. Or, the serving cell add operation may be the operation of configuring the small cell having the greatest small cell identification signal reception strength to the UE immediately or performing handover of the UE to the small cell.

Figure 7:
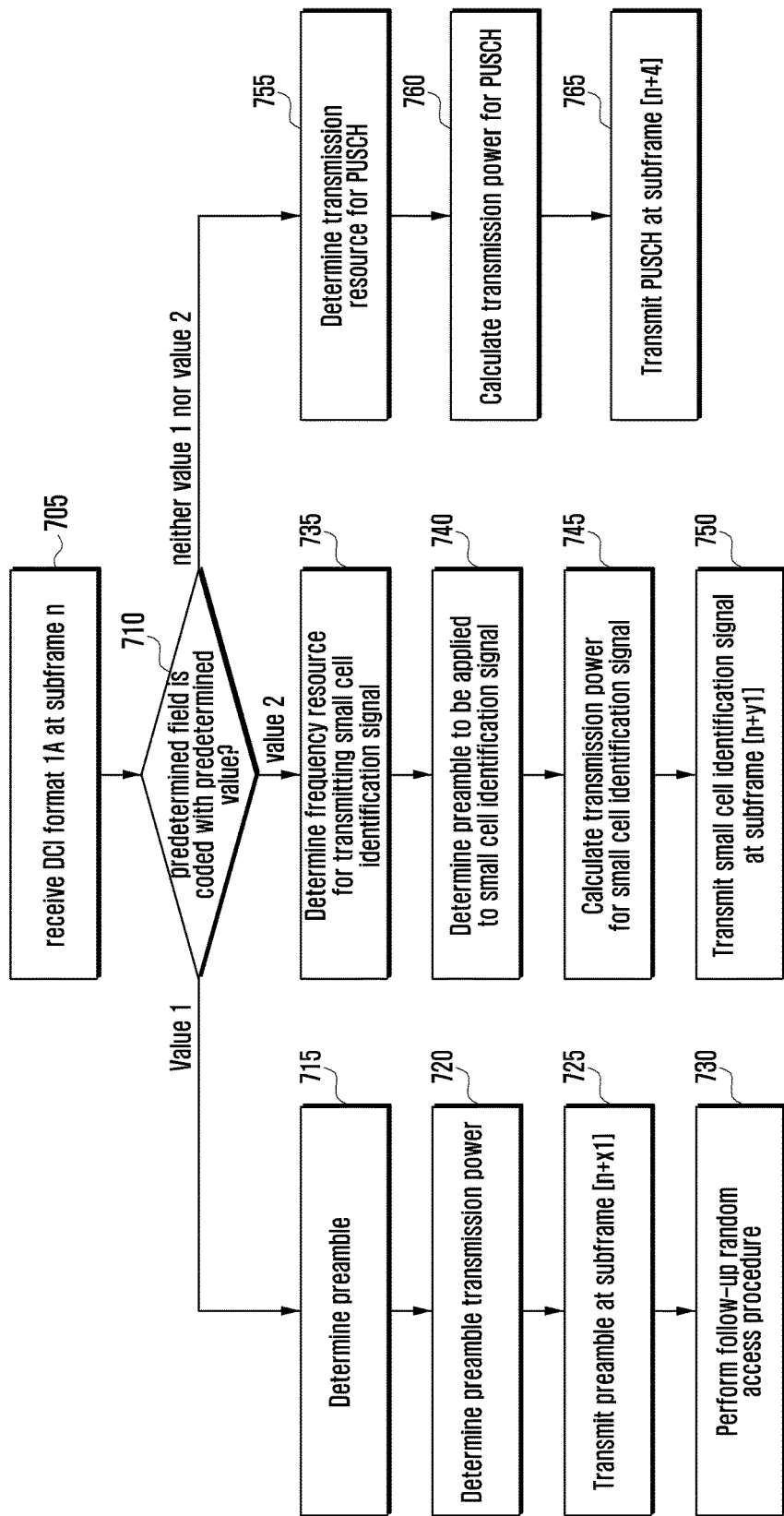
FIG. 7 is a diagram illustrating the UE operation of the first embodiment.
Figure 8:
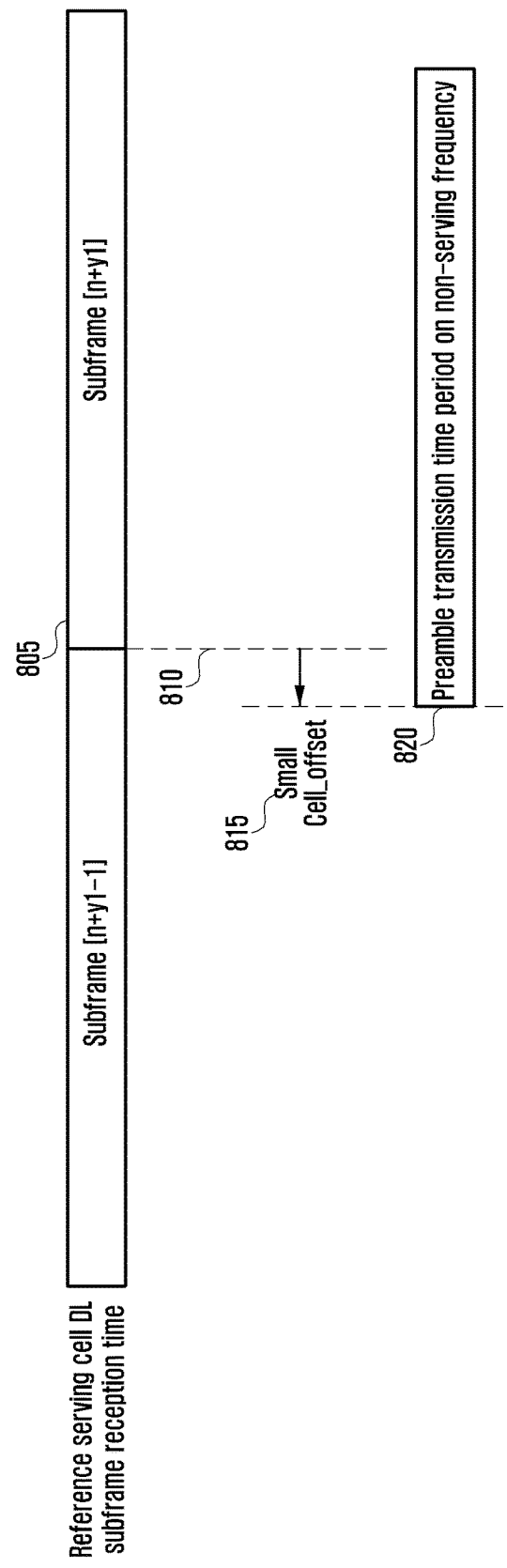
FIG. 8 is a diagram illustrating an example of determining time period for transmitting small cell identification signal.

FIG. 7 is shows the operations of the UE.

Referring to FIG. 7, the UE receives DCI format 1A at a certain subframe [n] through PDCCH at step 705. If the DCI format 1A is received through PDCCH, this means that the control signal to which DCI format 1A is applied is received through PDCCH correctly, and if the signal is received correctly, this means that the CRC test performed by masking (or scrambling) the CRC of the control signal with the identifier of the UE is successful. Depending on the embodiment, the UE may receiver different kinds of messages.

The details on DCI format 1A are specified in 36.212.

At step 710, the UE inspects a value of a predetermined field to check the purpose of the control signal with DCI format 1A is. If the predetermined field 1 is set to value 1, the control signal is PDCCH order; if the predetermined field 2 is set to 2, the control signal is small cell indication signal transmission command; and if neither the predetermined field 1 is set to value 1 nor the predetermined field 2 is set to 2, the control signal is of allocating transmission resource for PUSCH transmission.

The field 1 may be of the RB assignment field and last 3~4 bits and, if the RB assignment field is set to 1 as a whole and the last 3~4 bits 0 as a whole, this means that the filed 1 is set to value 1 and the corresponding DCI is PDCCH order.

The field 2 may be identical with the file 1 or consists of the RB assistant field. In the case that the field 2 is identical with the field 1, if the RB assignment field is set 1 as a whole and if the last 3~4 bits are set to 1 as a whole, this means that the field 2 is set to value 2.

In the case that the field 2 consists of the RB assignment field, the LSB of the RB assignment is set to 0 and the rest bits to 1, this means that the field 2 is set to value 2. If the field 2 is set to value 2, this means that the corresponding DCI is the small cell identification signal transmission command. The value 1 and value 2 may different from each other depending on the embodiment.

If the field 1 is set to value 1, the UE initiates random access operation in the serving cell at step 715. In detail, the UE determines the preamble for use in the random access procedure at step 715. The preamble is of being indicated in the preamble index field of the control signal.

The UE determines the transmission power of the preamble at step 720. The transmission power may be calculated as follows by applying the parameters of which the eNB has notifies the UE in advance through a predetermined method and the path loss of the corresponding serving cell.

Preamble transmission
power=preambleInitialReceivedTargetPower+
DELTAPREAMBLE+pathloss+(PREAMBLE-
TRANSMISSIONCOUNTER−1)*powerRamp-
ingStep The preambleInitialReceivedTargetPower and DELTAPREAMBLE are parameters defined per serving cell and informed to the UE through system information or dedicated RRC control message. The details thereon are specified in 36.331, 36.213, and 36.321.

The pathloss is the downlink pathloss of the cell in which random access is performed and measured by the UE.

(PREAMBLETRANSMISSIONCOUNTER−1)*powerRampingStep is a value added for increase of the transmission power when no response is received in reply to the preamble in the random access procedure and, it is 0 for the initial transmission of the preamble at step 720.

The UE transmits the preamble at the subframe [n+x1] of the corresponding serving cell at step 725.

Here, x1 is a integer greater than x and corresponds to the valid PRACH occasion arriving first after [n+x]. x denotes the time required for taking an action for the UE to transmit the preamble and is defined as a relatively large value in consideration of the low-end UE having low processing capability. In the current standard, it is defined as 6. The valid PRACH occasion denotes the PRACH occasion allowed for the UE to transmit the preamble with the PRACH mask index among the PRACH occasions defined by the PRACH configuration information. The details on PRACH mask index is specified in 36.321 and 36.213.

The UE continue the random access procedure by receiving a response message in reply to the preamble at step 730.

The UE starts the procedure for transmitting the small cell identification signal at step 735. At step 735, the UE determines the frequency resource for transmitting the small cell identification signal. The frequency resource is determined by the UE using the information provided to the UE at steps 630 and 645.

At step 740, the UE determines the preamble to be applied to the small cell identification signal. The preamble is indicated by the preamble index included in the control signal received at step 705.

At step 745, the UE calculates the transmission power for small cell identification signal transmission. The transmission power calculation method has been described already with reference to step 630, and the transmission power may be calculated as follows in addition to the description made with reference to step 630.

Preamble transmission
power=preambleInitialReceivedTargetPower1+DEL-
TAPREAMBLE1+pathloss1

The eNB may notify the UE of all of the preambleInitialReceivedTargetPower1, DELTAPREAMBLE1, and pathloss1 at step 630, the UE may retain the parameters in memory and reuse in performing random access on the corresponding frequency afterward.

At step 750, the UE transmits the small cell identification signal during the time period related to the subframe [n+y1].

y1 is an integer greater than y and indicates the subframe corresponding to the valid PRACH occasion arriving first after [n+y]. y denotes the time required for taking any action to transmit the preamble on a frequency other than the current serving frequency and has to be defined as a relatively large value in consideration of low-end UE having low processing capability, particularly greater than x.

A method of determining the time period for transmitting the small cell identification signal is described in more detail.

The UE determines the subframe [n+y1] 805 based on the downlink subframe timing of the current serving cell (or serving cell through which the small cell identification signal transmission command is received). Typically, the preamble transmission time point is determined based on the downlink subframe reception time of the corresponding cell. However, since the preamble is transmitted through a certain cell operating on a non-serving frequency, particularly the cell of which the timing synchronization is not acquired, other than the current serving cell, it is necessary to consider the case where the downlink subframe of the current serving cell mismatches the downlink subframe timing of the cell for receiving the preamble. In the case that the preamble transmitted by the UE is received at a subframe different from the PRACH occasion, interference may occur at the corresponding subframe. In order to avoid this, when the UE transmits the preamble on the non-serving frequency, it is necessary to adjust the transmission timing compared to the preamble transmission in the serving cell. Typically, by taking notice that the propagation delay of the macro cell is much greater than that of the small cell, it is possible to avoid the above problem by putting forward the preamble transmission timing by the difference between the macro cell propagation delay and the small cell propagation delay when transmitting the preamble in the small cell based on the downlink subframe of the macro cell. The UE determines the time point put forward as much as the small celloffset from the start time of the downlink subframe [n+y1] of the reference serving cell as the start time of the time period for transmitting the preamble on the non-serving frequency. The small celloffset may be contained in the other information of the small cell identification signal transmission command or the small cell identification signal configuration information.

If the procedure goes to step 755, this means that the signal received at step 705 is the uplink transmission resource allocation information, and the UE determines the frequency resource for PUSCH transmission by referencing the RB assignment filed of the received control signal.

At step 760, the UE determines the PUSCH transmission power in consideration of the RB assignment field and MCS field of the received control signal and downlink pathloss of the corresponding serving cell.

The UE transmits PUSCH at subframe [n+4] at step 765.

Second Embodiment

Recently, with the commercialization of various packet services, sporadic small packet transmissions occur frequently. In typical mobile communication systems including LTE, it is inevitable to establish a signaling connection and data bearer for packet transmission no matter how the packet is small. In the above procedure, a large number of control messages are exchanged and, if a large amount of UEs perform the connection establishment procedure for small size data communication, this may cause significant overload to the network and degradation of battery performance of the UEs. The present invention proposes a method and apparatus capable of allowing the UE to stay in the connected state in order to solve such a problem.

Typically, if data occurs to the UE in the idle state, the UE transitions from the idle state to the connected state to transmit/receive data. If there is no data transmission/reception during a predetermined period, the network has the UE transmission to the idle state.

Figure 9:
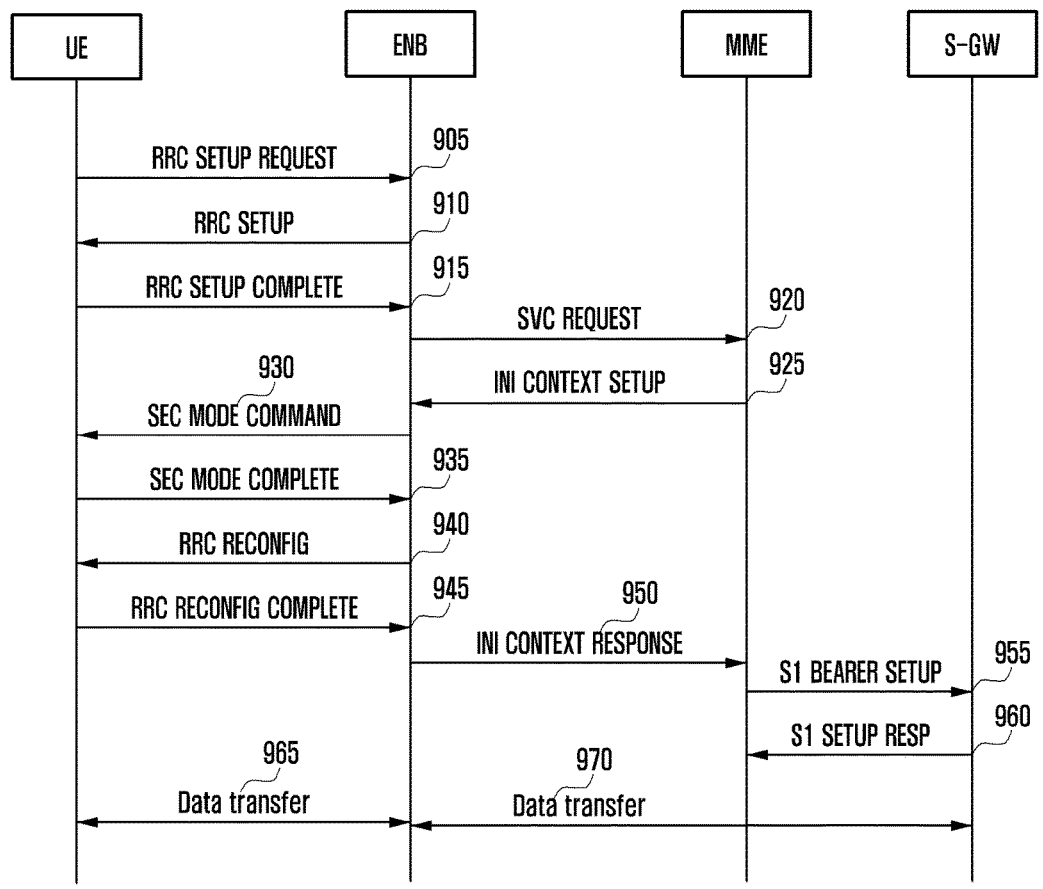
FIG. 9 is a diagram illustrating signaling overhead occurring in transitioning to the connected state.

Accordingly, if the small size data occur sporadically to the UE, the UE has to repeat state transition, resulting in increase of network overload and unnecessary battery power consumption. The state transition procedure of the UE is depicted in FIG. 9. As shown in FIG. 9, one state transition causes exchange of 12 control messages.

If data to be transmitted occurs, the UE having no current connection (hereinafter, idle mode UE) performs RRC connection setup procedure with the eNB. The UE establishes uplink transmission synchronization with the eNB through the random access procedure and sends the eNB an RRC CONNECTION SETUP REQUEST message at step 905. This message includes the identifier of the UE and the reason for establishing the connection.

The eNB sends the UE an RRC CONNECTION SETUP message for establishing RRC connection at step 910. This message includes RRC connection configuration information. The RRC connection is also referred to as Signaling Radio Bearer and used for exchange of RRC connection messages as control messages between the UE and the eNB.

After the establishment of RRC connection, the UE sends the eNB an RRC CONNECTION SETUP COMPLETE message at step 915. This message includes a control message called SERVICE REQUEST which is used for the UE to request the MME for bearer configuration for a predetermined service.

The eNB sends the MME a SERVICE REQUEST MESSAGE contained in the RRC CONNECTION SETUP COMPLETE message at step 920, and the MME determines whether to provide the service requested by the UE.

As a determination result, if it is determined to provide the service requested by the UE, the MME sends the eNB an INITIAL CONTEXT SETUP REQUEST message at step 925. This message includes QoS information for use in Data Radio Bearer (DRB) configuration, security information to be applied to the DRB (e.g. ciphering key, ciphering algorithm, integrity verification key, and integrity check key), etc.

In order to configure security, the eNB sends the UE a SECURITY MODE COMMAND message at step 930 and receives a SECURITY MODE COMPLETE message from the UE at step 935.

After completing the security configuration, the eNB sends the UE an RRC CONNECTION RECONFIGURATION message at step 940. This message includes the DRB configuration information for processing user data, and the UE configures DRB by applying this information and sends the eNB an RRC CONNECTION RECONFIGURATION COMPLETE message at step 945.

After completing the DRB configuration with the UE, the eNB sends the MME an INITIAL CONTEXT SETUP COMPLETE message at step 950 and, upon receipt of this message, the MME exchanges S1 BEARER SETUP message and S1 BEARER SETUP RESPONSE message with the S-GW for establishing an S1 bearer. The S1 BEARER is a connection for data transmission between the S-GW and eNB and mapped to DRB 1 by 1.

If the above procedure has completed, the UE communication data with the eNB through the S-GW at steps 965 and 970.

Although the UE stays in one cell for a long time without data to be transmitted/received, if there is a probability of small size sporadic data occurrence, it is preferred to maintain the connected state all the more.

At this time, it is preferred to configure the Discontinuous Reception (DRX) of the UE appropriately (e.g. set DRS-Cycle to long, and onDurationTimer, drx-inactivityTimer, or drx-RetransmissionTimer to short) to minimize the battery power consumption of the UE.

The UE in the RRC connected state performs handover according to the instruction of the eNB. Although handover is required due to the bad channel state of the current cell, if the eNB does not command handover, the UE cannot communicate with the current cell any more. The UE searches for a new accessible cell and establishes the RRC connection with the new cell and, this procedure is referred to as RRC Connection Reestablishment procedure.

Figure 10:
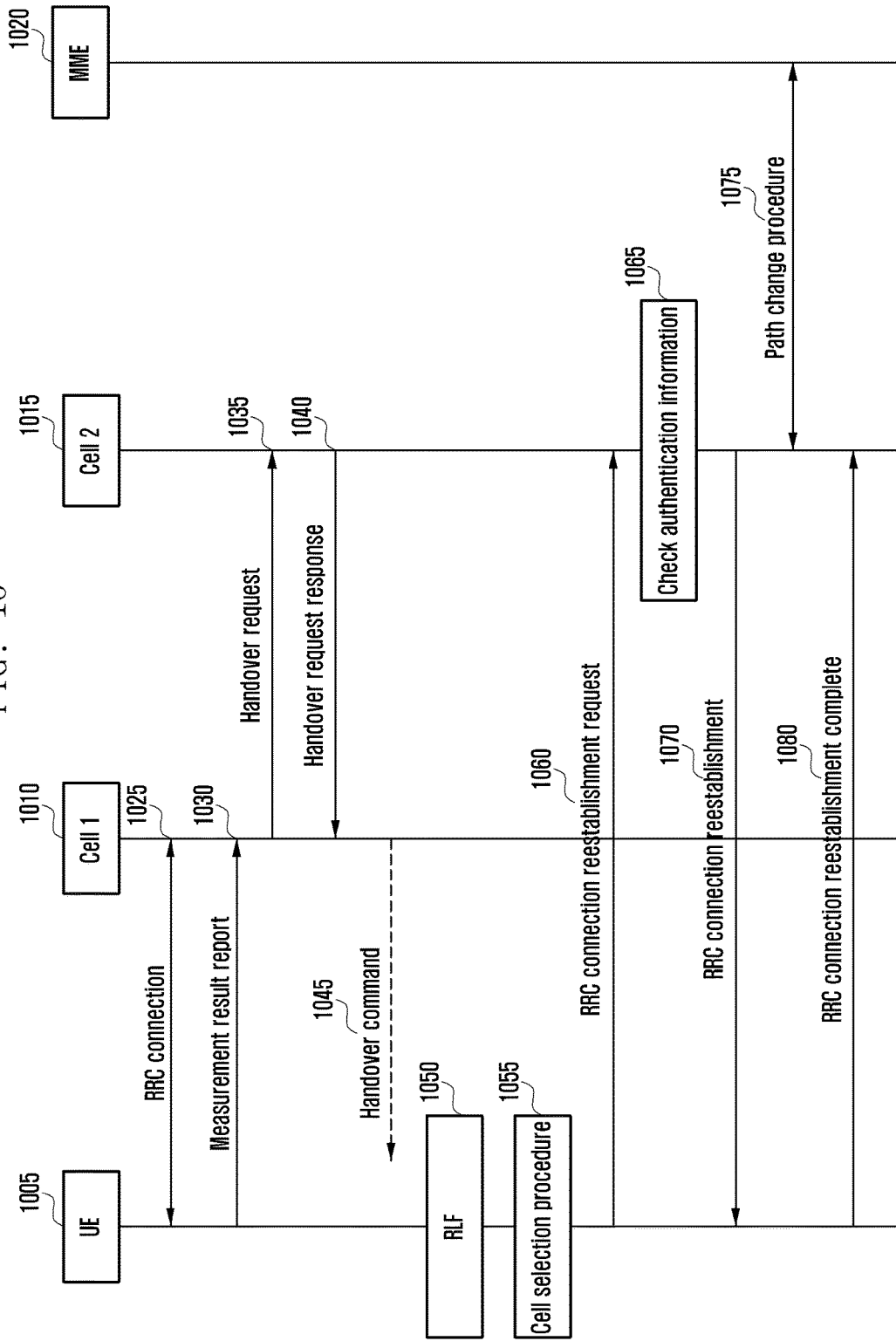
FIG. 10 is a diagram illustrating the RRC connection reestablishment procedure.

FIG. 10 shows the RRC connection reestablishment procedure.

If the UE 1005 maintains the RRC connection through the cell 1 1010 at step 1025 and if the channel quality of cell 2 1015 becomes better than that of cell 1 1010 at a certain time point, the UE reports this to the eNB at step 1030. The eNB controlling cell 1 1010 requests the eNB controlling cell 2 1015 at step 1035, and the eNB controlling cell 2 1015 performs call accept control procedure to determine whether to accept the handover. If it is determined to accept the handover, the eNB controlling cell 2 1015 sends the eNB controlling cell 1 1010 a response message in response to the handover request at step 1040. Through this procedure, the source cell eNB provides the target cell eNB with the information necessary for handover, and the target cell eNB provides the source cell eNB the configuration information to be used in the target cell after the handover.

The source cell eNB transmits the UE 1005 a handover command message at step 1045. At this time, if the channel condition of the UE 1005 becomes poor more quickly than as expected so as to be difficult to receive data from cell 101 already, the handover command may not be transmitted to the UE. If it is recognized that the radio link with the serving cell is maintained no longer before and after the time point, the UE declares Radio Link Failure (RLF) at step 1050 and starts cell selection procedure at step 1055. If a cell of which channel quality is better than a predetermined threshold, the UE 1005 transmits the RRC connection reestablishment request message in the cell at step 1060. This message includes the following informations.

1. Identifier used by UE in the serving cell right before (or cell where RLF has occurred): C-RNTI
2. Identifier of serving cell of the UE right before: Physical Cell Identity (PCI)
3. 16-bit message authentication information: 16-bit Message Authentication Code-Integrity (MAC-I) generated by UE for RRC connection reestablishment request message using various informations of the serving cell right before (or cell where RLF has occurred)
4. RRC connection reestablishment request reason: reconfiguration failure or handover failure may be indicated.

The eNB of the new cell, i.e. eNB of cell 2 1015, performs integrity verification procedure of the message authentication information at step 1065. The source eNB sends the message authentication information to the target eNB in the handover request message, and the eNB of cell 2 1015 compares the message authentication information transmitted by the UE and the message authentication information transmitted by the source eNB and, if the two authentication informations match, accepts the RRC connection reestablishment request. If the two authentication information mismatch, the eNB of cell 2 1015 rejects the RRC connection reestablishment request; and the UE releases the RRC connection, performs cell selection procedure again, starts RRC connection setup procedure.

The eNB of cell 2 1015 commands the UE to perform RRC connection reestablishment at step 1070 and, if the UE 1005 sends a response message in reply at step 1080, the RRC connection reestablishment procedure is completed successfully such that the UE can continue communication with cell 2 1015.

Around the timing of commanding the RRC connection reestablishment, the eNB of cell 2 1015 requests the MME for path change at step 1075. The path change means changing the route from the S-GW to the eNB to the route from cell 1 101 to cell 2 1015.

As shown in the above, in order to complete the RRC connection reestablishment successfully, it is necessary to perform the handover preparation procedure between the source and target eNBs. Accordingly, if the RLF occurs before the UE 1005 reports the measurement result, the RRC connection reestablishment procedure of the UE 1005 fails always, and this brings new RRC connection setup procedure.

As described above, in order to allow the UE having no data transmission/reception to stay in the RRC connected state, it is preferred to set DRX-Cycle to a relatively large value. Since the UE in the RRC connected state performs serving and neighbor cell measurement at every DRX cycle, as the DRX period increases, RLF is likely to occur before the measurement result report of the UE 100g.

The second embodiment of the present invention proposes a method and apparatus for protecting the QoS degradation and increase of signaling overhead by completing the RRC connection reestablishment procedure successfully even though the radio link failure occurs before the measurement result report of the UE 1005.

Figure 11:
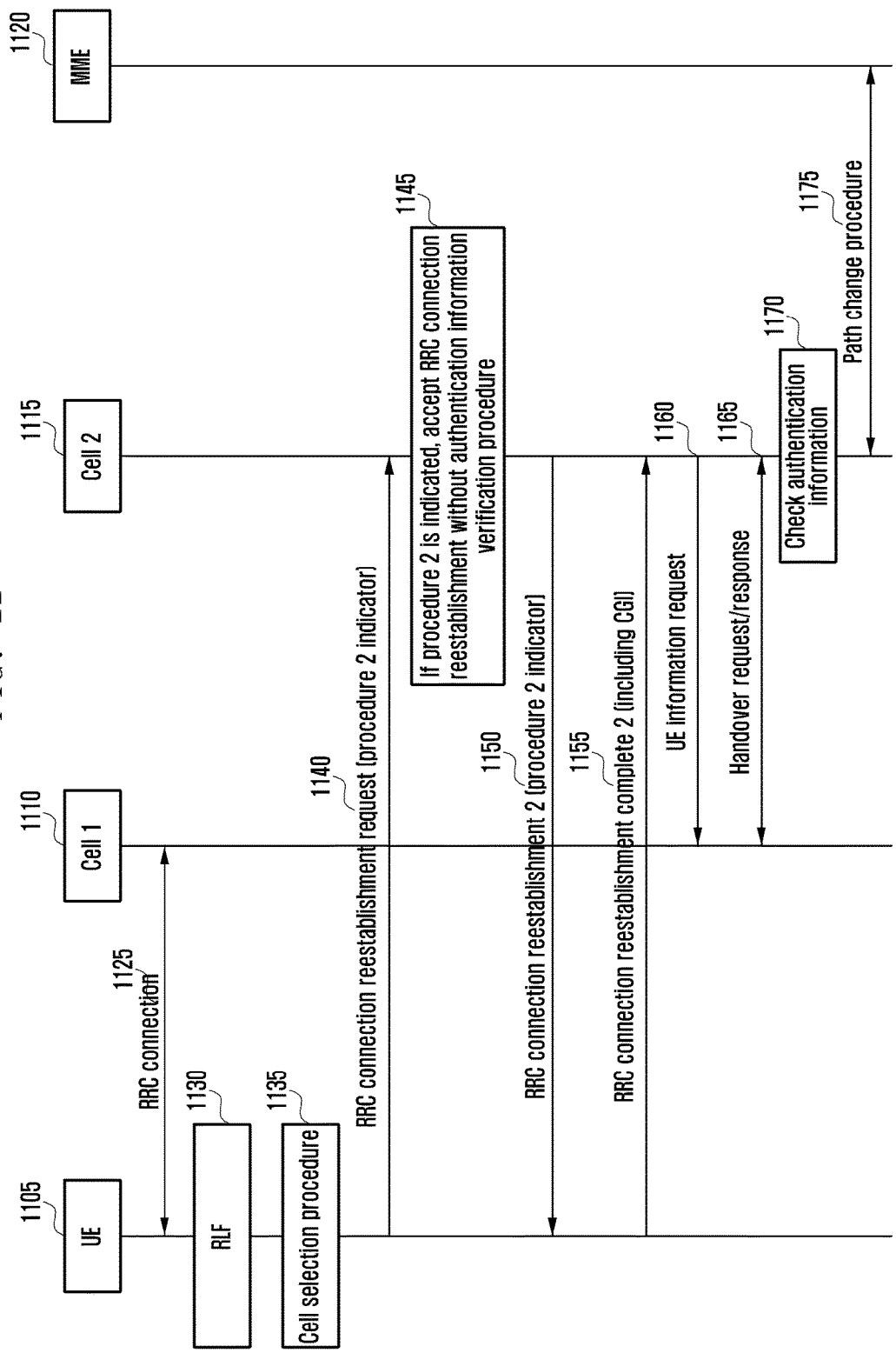
FIG. 11 is a diagram illustrating overall operation of the second embodiment.

FIG. 11 shows the overall operation.

The UE 1105 maintains RRC connection through cell 1 1110 at step 1125, and the quality of the radio link with cell 1 1110 becomes worse than a predetermined threshold at a certain time point and thus the UE 1105 declares RLF at step 1130. The UE 1105 starts cell selection procedure to recover the communication at step 1135. If it is detected that the channel quality becomes better than a predetermined threshold, the UE 1105 transmits an RRC connection reestablishment request message in the cell at step 1140. The UE 1105 determines whether a measurement result message which may trigger handover has been transmitted before the declaration of RLF and, if no measurement result message has been transmitted, transits the RRC connection reestablishment request message including a predetermined indicator in order to increase the probability of successful RRC connection reestablishment procedure. The procedure 2 indicator is the indicator requesting the eNB to use the procedure described throughout FIG. 11, and the eNB checks whether the RRC connection reestablishment request message includes the procedure 2 indicator to determine whether to perform the normal RRC connection reestablishment procedure or RRC connection reestablishment procedure 2.

The procedure 2 indicator may be included in the RRC connection reestablishment request message as an extra bit or use one of the reserved bits of the RRC connection reestablishment request cause (Establishment Cause).

If the RRC connection reestablishment request message is received, the cell 2 selected by the UE 1105 through the cell selection procedure checks whether the procedure 2 indicator is included. If not included, the normal RRC connection reestablishment procedure is performed. That is, the cell 2 checks the integrity of the message authentication information included in the RRC connection reestablishment request message and, if the integrity verification fails, rejects the RRC connection reestablishment request. Since no handover preparation procedure is not performed in FIG. 11, the cell 2 1115 has not information on the UE 1105, and the eNB of the cell 2 1115 rejects the RRC connection reestablishment request. If the RRC connection reestablishment request message received at step 1140 includes the procedure 2 indicator, the eNB of the cell 2 1115 performs a follow-up procedure under the assumption that the integrity of the message authentication information has been verified successfully. That is, if a new UE can be served in the corresponding cell, the RRC connection reestablishment is allowed. The eNB of cell 2 1115 generates and transmits an RRC connection reestablishment message 2 to the UE. Or the eNB of cell 2 1115 generates and transmits the RRC connection reestablishment message including the procedure 2 indicator to the UE at step 1150. The normal RRC connection reestablishment message includes SRB 1 configuration information and nextHopChainingCourt. SRB 1 denotes the radio bearer transmitting/receiving predetermined RRC control messages. nextHopChainingCount is a parameter for generating a security key in next handover and transmitted from the source eNB to the target eNB through the handover preparation procedure. The UE retains the nextHopChainingCount included in the RRC connection reestablishment message and generates a new security key by applying the parameter in the next handover.

The RRC connection reestablishment message 2 includes the information indicating that the corresponding control message is the RRC connection reestablishment message 2 other than the normal RRC connection reestablishment message, e.g. procedure 2 indicator information.

As described above, nextHopChainingCount is the information acquired from the source eNB and thus cannot be included in the RRC connection reestablishment message 2. Accordingly, although the target eNB includes nextHopChainingCount generated by the target eNB arbitrarily in the RRC connection reestablishment message 2, the UE discards the nextHopChainingCount included in the RRC connection reestablishment message 2. After the RRC connection reestablishment procedure 2 has completed, the eNB sends the UE the true nextHopChainingCount in a predetermined RRC control message, e.g. RRC connection reestablishment message, and the UE stores the received nextHopChainingCount for use in next handover after the completion of the RRC connection reestablishment procedure 2.

If an RRC connection reestablishment 2 control message is received, the UE generates and transmits an RRC connection reestablishment complete 2 message at step 1155. The RRC connection reestablishment complete 2 message includes cellGlobalID information of the cell in which RLF has occurred (or serving cell right before) or information for the eNB of cell 2 1110 to indicate the eNB of cell 1 1115 and RLF occurrence time information (or time elapsed sing the RRF occurrence) as well as the information included in the normal RRC connection reestablishment complete message. cellGlobalID information is the 28-bit information designating a cell in PLMN and specified in 36.331. If the eNB of cell 2 1115 designates the eNB of cell 1 1110, this means that the eNB of cell 2 1115 identify the eNB to which the control message requesting for UE information is transmitted and checks the information necessary for transmitting the control message to the eNB, i.e. address of the corresponding eNB. The eNB of cell 2 1115 sends the eNB of cell 1 1110 a UE information request message including C-RNTI of the UE, cellGlobalID, and RLF occurrence time (or time elapsed since RLF occurrence) at step 1160.

If the control message is received, the eNB of cell 1 1110 checks the UE performing the RRC connection reestablishment procedure 2 in cell 2 1115 based on C-RNTI, cellGlobalID, and RLF occurrence time information included in the control message. Next, the eNB of cell 1 1110 initiates the procedure of transmitting the UE information and data to the eNB of cell 2 1115. For this, a new procedure may be introduced or the legacy handover procedure may be reused. That is, the eNB of cell 1 1110 identifies the UE of which UE information is requested, sends THE eNB OF CELL 2 1115 a HANDOVER REQUEST message as if the procedure for handover of the UE to the cell 2 1116 has been triggered, and receives a HANDOVER REQUEST ACKNOWLEDGE message from the eNB of cell 2 1115 at step 1165.

The eNB of cell 2 1115 verifies the integrity of the message authentication information transmitted by the UE at step 1140 using the message authentication information included in the handover request message. If the integrity verification on the message authentication information is successful, the eNB of cell 2 1115 performs a follow-up procedure, e.g. path change procedure, at step 1175 and sends the eNB of cell 1 1110 a control message commanding to release the UE context (UE CONTEXT RELEASE).

If the integrity verification on the message authentication information fails, the eNB of cell 2 1115 releases the RRC connection of the UE and notifies the eNB of cell 1 1110 of the RRC connection release.

Figure 12:
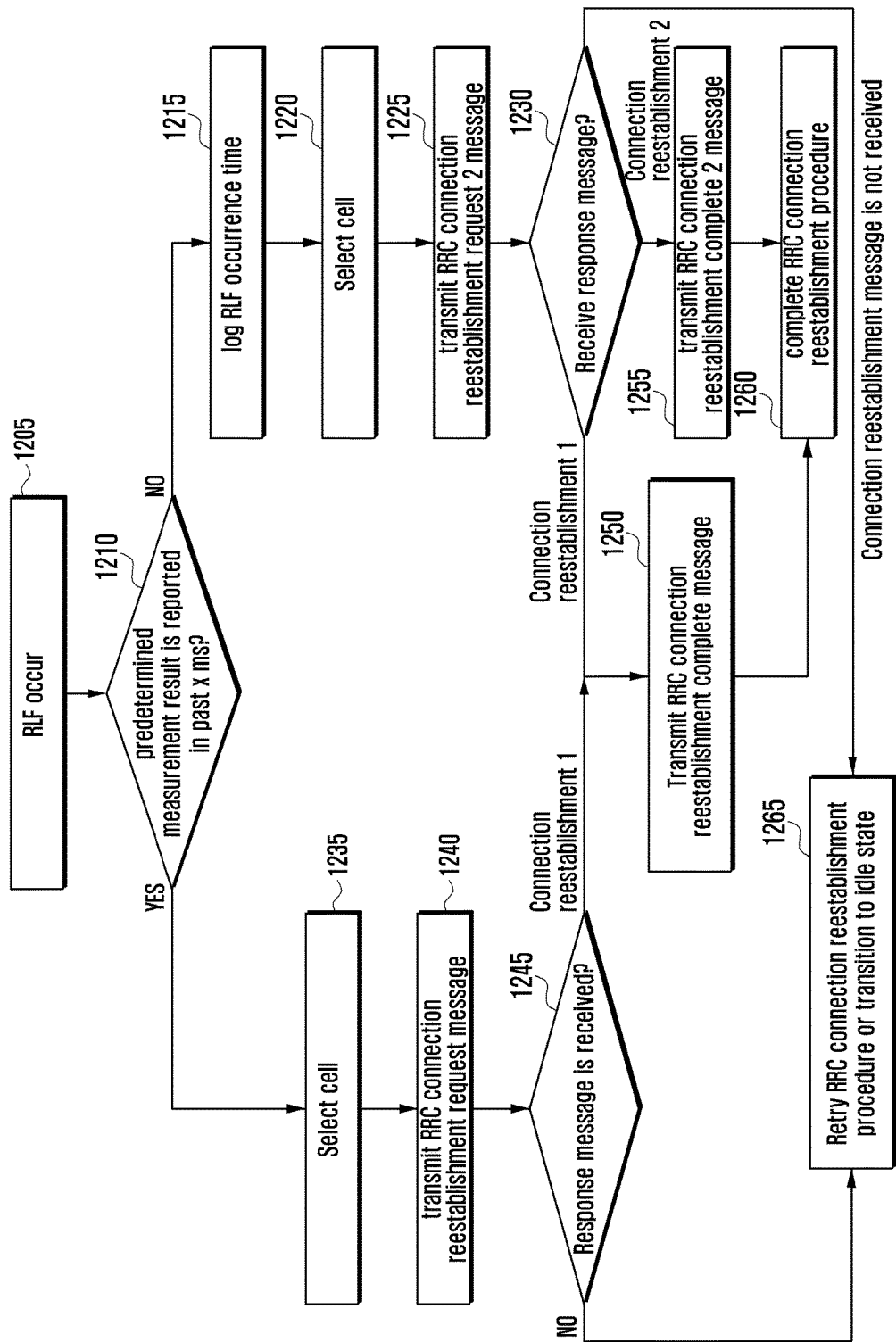
FIG. 12 is a diagram illustrating the UE operation of the second embodiment.

FIG. 12 shows UE operations.

Referring to FIG. 12, if RLF occurs at step 1205, the UE determines whether a predetermined measurement result message has been received in the past x ms at step 1210. The predetermined measurement result message denotes the measurement result report message which is likely to trigger handover preparation procedure, e.g. the measurement result report message generated when the state in which the channel quality of a neighbor cell is better than that of the serving cell over a predetermined value is maintained during a predetermined period.

If the condition is fulfilled a step 1210, the probability that the handover preparation procedure has started is very high and thus the UE starts the normal RRC connection reestablishment procedure. If the condition is not fulfilled at step 1210, the probability that the handover preparation procedure has not started is very high and thus the UE starts the RRC connection reestablishment procedure 2 at step 1215.

The UE stores the RLF occurrence time at step 1215. Or, the UE starts a predetermined timer at the time when RLF occurs to determine the time elapsed since the RLF occurrence.

The UE performs the cell selection procedure at step 1220. The cell selection procedure is the procedure in which the UE detects cells and selects one of the cells that is capable of normal communication. In the cell selection procedure, if the channel quality is higher than a predetermined threshold and if access is not barred, the UE initiates the RRC connection reestablishment procedure 2.

At step 1225, the UE initiates the random access procedure in the selected cell and transits the RRC connection reestablishment request 2 message using the transmission resource allocated in the random access procedure. The message is similar to the RRC connection reestablishment request messaged with the exception that the message further include the information indicating that the UE requests for the RRC connection reestablishment procedure 2.

After transmitting the RRC connection reestablishment request 2 message, the UE waits for receiving a response message at step 1230. At this time, there are 4 cases.

1. RRC connection reestablishment 1 message is received: This means that the eNB which has received the RRC connection reestablishment request 2 message does not support the RRC connection reestablishment procedure 2 and the procedure goes to step 1250.

2. RRC connection reestablishment 2 message is received: This means that the eNB which has received the RRC connection reestablishment request 2 message supports the RRC connection reestablishment procedure 2 and the RRC connection reestablishment procedure 2 will be performed, and the procedure goes to step 1255.

3. RRC connection reestablishment reject message is received: The procedure goes to step 1265.

4. No response is received before expiry of predetermined time period since the receipt of RRC connection reestablishment request 2 message: The procedure goes to step 1265.

At step 1250, the UE configures SRB 1 according to the SRB configuration information included in the received RRC connection reestablishment 1 message, stores nextHopChainingCount, and transmits the RRC connection reestablishment complete message. Then the procedure goes to step 1260 to complete the RRC connection reestablishment procedure.

At step 1255, the UE configures SRB 2 according to the SRB configuration information included in the received RRC connection reestablishment 2 message and, although it is included, ignores the nextHopChainingCount. The UE transmits the RRC connection reestablishment complete 2 message and completes the RRC connection reestablishment procedure at step 1260.

At step 1265, if no response message is received, the UE retries the RRC connection reestablishment procedure and, otherwise if the connection reestablishment reject message is received, transitions to the idle state.

At step 1235, the UE performs cell selection procedure.

At step 1240, the UE transmits the RRC connection reestablishment request message and waits for receiving a response message. If the RRC connection reestablishment 1 message is received at step 1245, the procedure goes to step 1250 and, otherwise if the RRC connection reestablishment reject message is received or no response message is received before the expiry of predetermined time period since the transmission of the RRC connection reestablishment request message, step 1265.

Third Embodiment

The third embodiment of the present invention proposes a method of using the procedure simplified as compared to the normal RRC connection setup procedure, when the UE configures RRC connection in the same cell, by storing the UE context during a predetermined period although the RRC connection of the UE is released.

Figure 13:
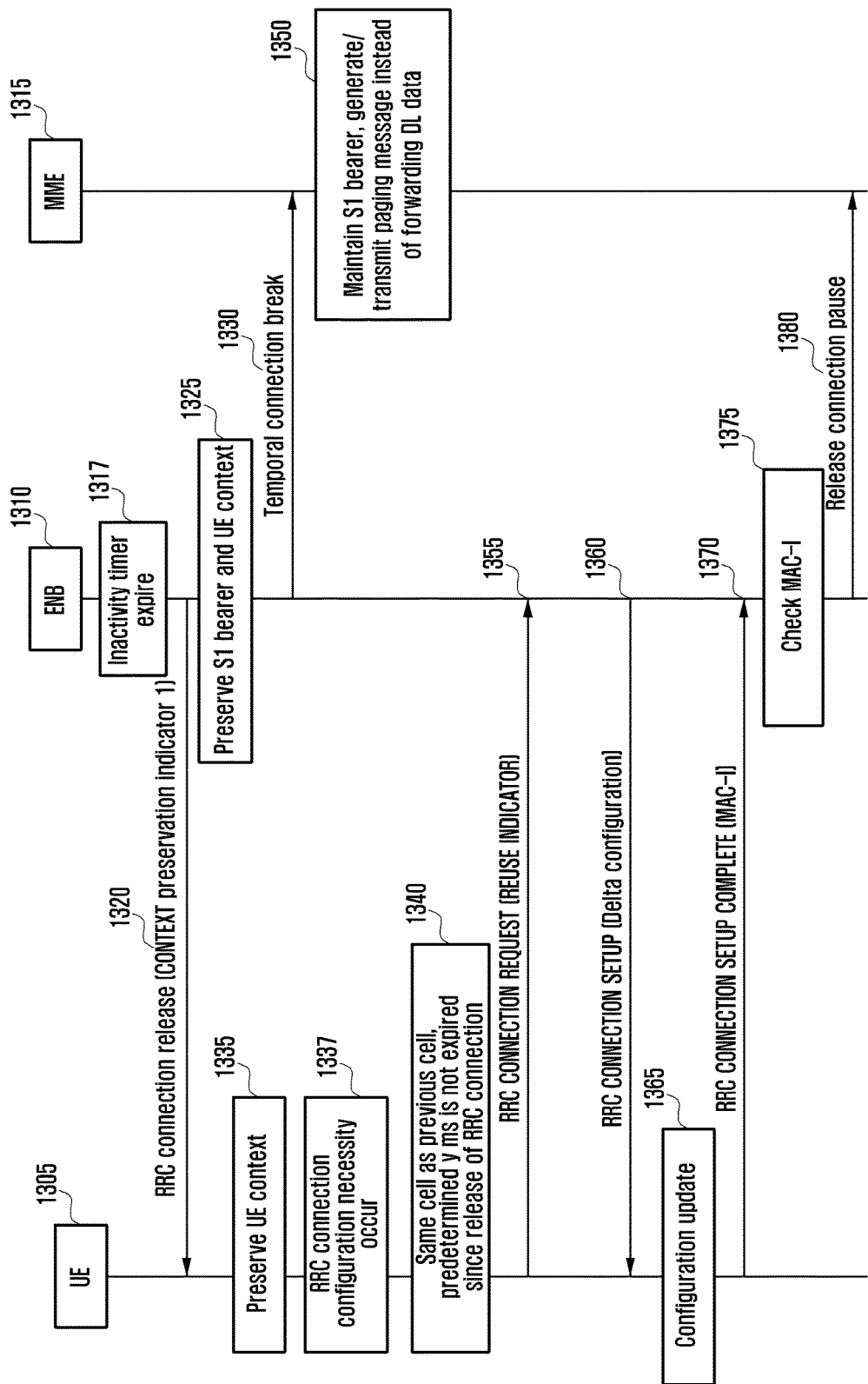
FIG. 13 is a diagram illustrating the overall operation of the third embodiment.

FIG. 13 shows the overall operation of the third embodiment.

Referring to FIG. 13, the UE 1305 in the RRC connected state communicates data with the eNB 1310. If the data communication stops, the eNB 1310 starts a predetermined timer and, if the data communication is not resumed before the expiry of the timer at step 1317, considers release of the RRC connection of the UE 1305. The eNB 1310 releases the RRC connection of the UE 1305 according to a predetermined rule and determines whether to release or preserve the UE context during a predetermined period. For example, if the UE is of generating small size data sporadically as a result of the past traffic characteristic analysis, the eNB 1310 may determine to preserve the UE context.

The eNB 1310 transmits a control message instructing the UE 1305 to release the RRC connection and notifies the UE 1305 of the context release at step 1320. The control message may include at least one of the following informations.

1. Validity period: Period during which the eNB 1310 preserves the context
2. Valid cell list: List of the cell to which the UE 1305 is capable of applying the procedure of using the stored UE context when it intends to reconfigure the RRC connection in the validity period. Typically, it is the list of the cells controlled by the eNB 1310 and comprised of PCI information and frequency information of the cells.

After release of the RRC connection of the UE, the eNB 1310 preserves the UE context and S1 bearer. The S1 bearer denotes the S1-control bearer for use in exchanging control messages between the eNB 1310 and the MME 1315 and S1-user plane bearer for use in communicating user data between the eNB 1310 and the S-GW. By maintaining the S1 bearer, when the UE 1305 configures the RRC connection in the same cell or same eNB, it is possible to skip the procedure of configuring S1-bearer. If the validity period expires, the eNB 1310 may delete the UE context and release the S1 bearer.

The eNB 1310 sends the MME 1315 a control message requesting for pause in the connection. If the control message is received, the MME 1315 instructs, when the downlink data occurs to the UE, the S-GW to request the MME 1315 for paging procedure initiation without transmitting the downlink data to the eNB 1310, and the S-GW operates according to this instruction at step 1350. If it does not operate in this way, i.e. if the S-GW sends the eNB 1310 the downlink data, the eNB 1310 which has received the downlink data to the UE 1305 of which RRC connection has been released has to store the data in the buffer and perform paging procedure. If the UE 1305 has moved to the area of another eNB, there is a burdensome operation of requesting the MME 1315 to initiate paging procedure. In order to avoid this, the eNB 1310 sends the MME 1315 the connection pause control message for the UE of which RRC connection has been released but UE context is stored.

The RRC connection release message including the information indicating context preservation is received, the UE 1305 release the RRC connection, starts the timer corresponding to the validity period, store the valid cell list in the memory, and preserves the current UE context in the memory without deletion at step 1335. The UE context denotes the informations related to the RRC configuration of the UE 1305 and includes at least one of the followings.

1. Cell level identifier of UE (C-RNTI)
2. SRB configuration information
3. DRB configuration information
4. Physical Uplink Control Channel (PUCCH) transmission resource information and configuration information
5. Neighbor cell measurement configuration information
6. Security key information (KENB, RRC key information, user data key information, etc.)
7. Security counter information (information on integer/counter to be applied to ciphering or integrity check).

The UE 1305 retains the UE context and, if the RRC connection release command is received, preserves some part of the UE context and deletes the other part. The deleted information may include transmission resource allocation information, e.g. PUCCH transmission resource information, the C-RNTI is released too.

Afterward, it becomes necessary to configure the RRC connection for a certain reason at step 1337. Although the UE 1305 which has not been aware of the preservation of the context in the previous RRC connection release procedure initiates the normal RRC connection setup procedure, the UE 1305 which has been aware of the preservation of the context in the previous RRC connection release procedure checks whether the validity period has expired to determine and whether the current cell is of receiving the RRC connection release message allowing preservation of the context in the current serving cell or the current serving cell is the cell included in the valid cell list to determine whether to apply the normal RRC connection procedure or the simplified RRC connection procedure and, and if the two conditions are fulfilled, initiates 'RRC connection setup procedure using stored UE context.' The 'RRC connection setup procedure using stored UE context' includes transmitting a first message from the UE to the eNB, transmitting a second message from the eNB to the UE, and transmitting a third message from the UE to the eNB.

The first message may be a modified RRC connection request message 1355, the second message a modified RRC connection setup message 1360, and the third message a modified RRC connection setup complete message 1370. Also, the first message may be a modified RRC connection reestablishment request message 1455, the second message a modified RRC connection reestablishment message 1460, and the third message a modified RRC connection reestablishment complete message 1470.

If the UE 1305 transmits the modified RRC connection request message at step 1355, the eNB 1310 searches for the UE context by referencing the UE identifier included in the message. On the basis of the retrieved UE context, the eNB determines the configuration to be applied to the RRC connection of the UE and sends the UE 1305 the modified RRC connection setup message including the configuration information at step 1360. The modified RRC connection request message is the control message including the information indicating 'RRC context reuse' in addition to information of the normal RRC connection request message. The modified RRC connection setup message includes various informations associated with the RRC connection configuration of the UE like the RRC connection configuration message. If the UE receives the normal RRC connection setup message, the RRC connection setup message, the RRC connection is configured based on the configuration information indicated in the RRC connection setup message and, otherwise if the UE receives the modified RRC connection setup message, configures the RRC connection in consideration of all the stored configuration information and the configuration information included in the control message. For example, the UE determines the included configuration information as the delta information on the stored configuration information and updates the configuration information or UE context at step 1365. For example, if SRB configuration information is included in the modified RRC connection setup message, the UE configures the SRB by applying the received SRB configuration information and, otherwise if the SRB configuration information is not included in the modified RRC connection setup message, configures the SRB by applying the SRB configuration information stored in the UE context.

The 'RRC connection setup procedure using stored UE context' is performed through the random access procedure. In the random access procedure, the UE is allocated a temporary C-RNTI through the random access response message. If the random access procedure completes successfully, the temporary C-RNTI as the formal C-RNTI. The UE 1305 updates the UE context using the C-RNTI allocated newly at step 1365 and the configuration information included in the modified RRC connection setup message.

The UE 1305 configures the RRC connection by applying the updated UE context and configuration information and sends the eNB the modified RRC connection setup complete message at step 1370. The modified RRC connection setup complete message is the control message acquired by adding the message authentication information MAC-I to the normal RRC connection setup complete message. The MAC-I is the message authentication code calculated by the UE 1305 for the control message by applying the security information of the recovered UE context, i.e. security key and security counter. If the modified RRC connection setup message is received, the eNB 1310 checks the integrity of the message using the MAC-I of the message and security key and security counter stored in the context of the UE 1305 at step 1375. If the integrity check is successful, the eNB 1310 sends the MME 1315 the control message requesting for connection pause release at step 1380. If this message is received, the MME 1315 instructs the S-GW to process the data for the UE 1305 normally.

If the above procedure has complete, the UE resumes data communication in the cell 1.

Figure 14:
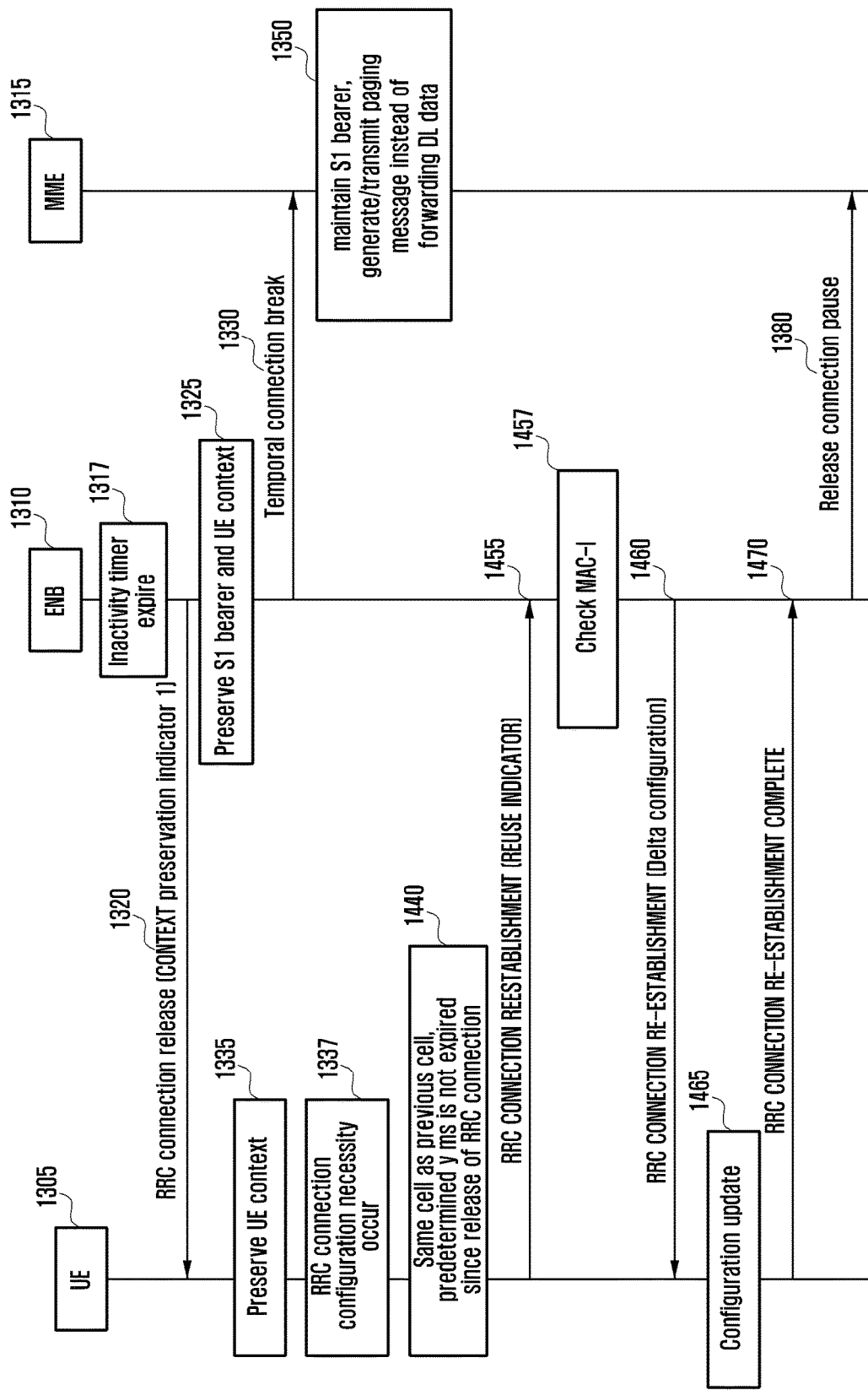
FIG. 14 is a diagram illustrating another overall operation of the third embodiment.

FIG. 14 is a diagram illustrating overall operation according to another embodiment.

FIG. 14 shows the overall operation using the first message as a modified RRC connection reestablishment request message at step 1455, the second message as a modified RRC connection reestablishment message at step 1460, and the third message as a modified RRC connection reestablishment complete message at step 1470.

If RRC connection setup is required for a certain reason at step 1337, the UE determines whether to perform the normal RRC connection setup procedure or modified RRC connection reestablishment procedure (RRC connection setup procedure using stored UE context) at step 1440. If the validity period has not expired yet and if the current serving cell is included in the cell list or if the current serving cell is identical with the cell of which RRC connection has been released most recently or the current serving cell is identical with the cell indicated to release the RRC connection while preserving the UE context, the UE determines to perform the modified RRC connection reestablishment procedure instead of the normal RRC connection setup procedure.

The modified RRC connection reestablishment procedure is comprised of transmitting/receiving modified RRC connection reestablishment request message, modified RRC connection reestablishment message, and modified RRC connection reestablishment complete message.

If it is determined to perform the modified RRC connection reestablishment procedure instead of the RRC connection setup procedure, the UE sends the eNB the modified RRC connection reestablishment request message at step 1455. The modified RRC connection reestablishment request message includes the C-RNTI which the UE has used in the serving cell right before (or the cell of which RRC connection has been released most recently), PCI of the serving cell right before (or the cell of which RRC connection has been released most recently), 16-bit message authentication information, and UE-context reuse indication information.

If the modified RRC connection reconfiguration message including the UE context reuse indication information is received, the eNB 1310 searches for the corresponding UE context based on the C-RNTI and PCI information of the message. The UE checks the integrity of the 16-bit message authentication information using the security-related information stored in the retrieved UE context at step 1457. If the integrity is checked, the eNB 1310 determines the configuration to be applied to the RRC connection of the UE based on the corresponding UE context and sends the UE the modified RRC connection reestablishment message included in the configuration information at step 1460. The modified RRC connection reestablishment message includes various informations associated with the RRC connection setup of the UE like the RRC connection reestablishment message. If the normal RRC connection reestablishment message is received, the UE 1305 configures the RRC connection based on the configuration information included in the RRC connection reestablishment message and, otherwise if the modified RRC connection reestablishment message is received, configures the RRC connection in consideration of both the stored configuration information and the configuration information included in the control message. For example, the UE determines the included configuration information as the delta information on the stored configuration information and updates the configuration information or UE context at step 1465. For example, if SRB configuration information is included in the modified RRC connection reestablishment message, the UE configures the SRB by applying the received SRB configuration information and, otherwise if the SRB configuration information is not included in the modified RRC connection reestablishment message, configures the SRB by applying the SRB configuration information stored in the UE context.

If the RRC connection setup has completed, the UE sends the eNB the modified RRC connection reestablishment complete message at step 1470.

Figure 15:
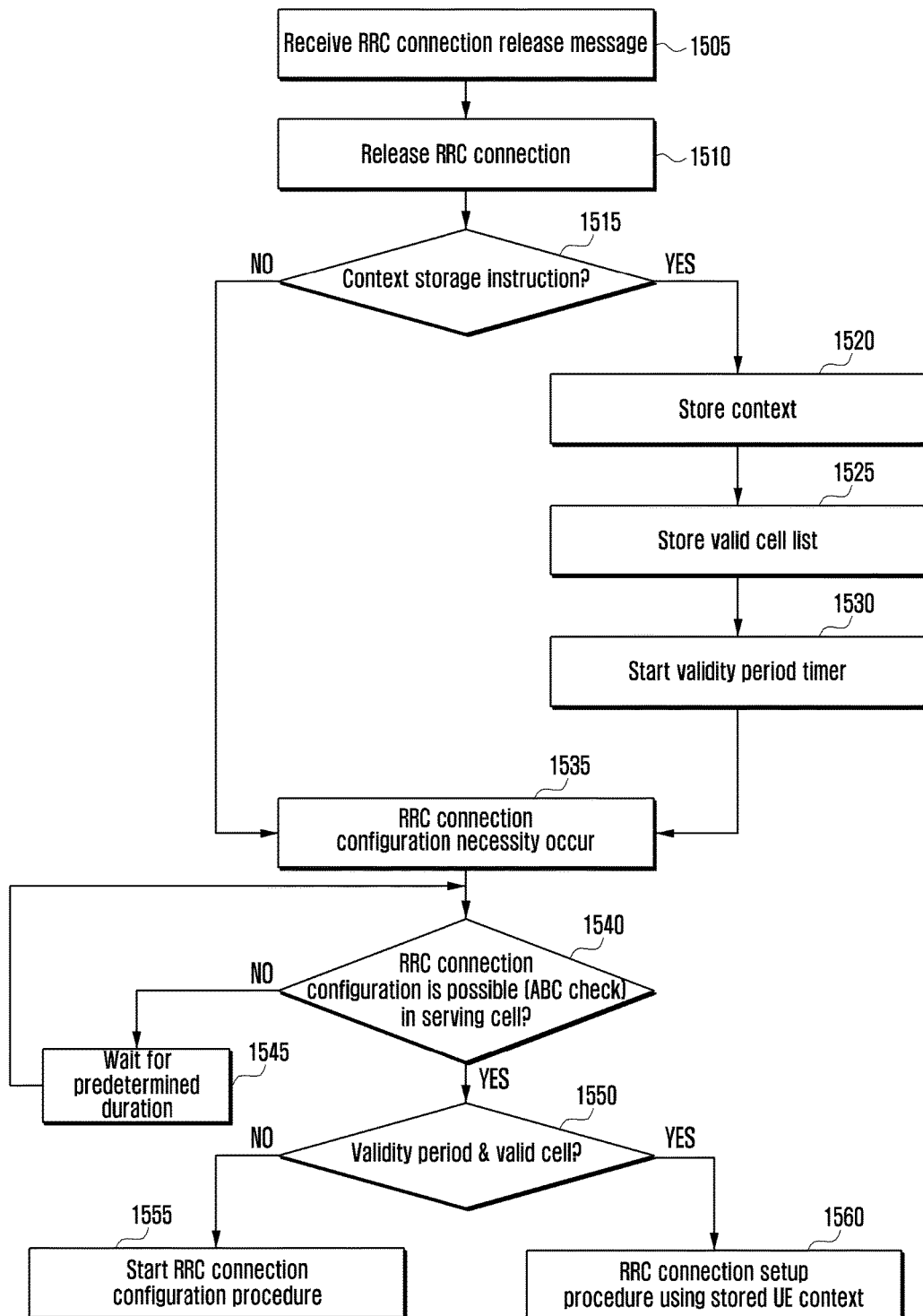
FIG. 15 is a diagram illustrating the UE operation of the third embodiment.

FIG. 15 shows the overall operation of the UE according to an embodiment.

Referring to FIG. 15, the UE receives a control message instructing RRC connection release from the eNB at step 1505.

The UE releases the RRC connection at step 1510 and checks whether the control message includes context storage control information at step 1515. If the context storage control information is included, the procedure goes to step 1520 and, otherwise the context storage control information is not included, waits until the RRC connection configuration becomes necessary.

At step 1520, the UE stores a predetermined part of the current UE context and discards the rest.

At step 1525, the UE stores the valid cell list in the memory. The valid cell list is a set of the cells including the cells in which the RRC connection release message has been received, and it may be signaled explicitly in the RRC connection release message or determined by the UE implicitly.

At step 1530, the UE starts the validity period timer and waits until the RRC connection setup becomes necessary. There is no necessity of specific temporal order among steps 1520, 1525, and 1530. That is, these steps are performed in different sequential orders or simultaneously.

If the RRC connection setup becomes necessary at step 1535, that is, the higher layer requests the RRC layer for the RRC connection configuration, the UE determines whether the RRC connection setup is possible in the current cell at step 1540. In more detail, the UE checks the access class barring and determines the possibility of initiating the RRC connection configuration in the corresponding cell only when the access is not barred in the currently cell, and procedure goes to step 1550. If access is barred in the current cell, the UE waits for a predetermined period at step 1545 and then returns the procedure to step 1540. How to check the access class barring is specified in 36.331.

At step 1550, the UE determines whether the current cell is included in the valid cell list and whether the validity period timer has not been expired. If both the two conditions are fulfilled, the UE performs the RRC connection setup procedure using the stored UE context at step 1560 and, otherwise at least one of the two conditions is not fulfilled, the UE performs the RRC connection setup procedure at step 1555. The RRC connection setup procedure using the stored UE context means the procedure of steps 1355, 1360, 1365, and 1370 or the procedure of steps 1455, 1460, 1465, and 1470.

Fourth Embodiment

In the small cell environment, the probability of frequent handover of the UE increases. Whenever handover occurs, the UE exchanges full header packet or Initialization and Refresh (IR) packets with the eNB to initialize the Robust Header Compression (ROHC) context and reestablish the initialized ROHC context in the new cell. Transmitting the IR packet large in size as compared to the header-compressed packet causes inefficiency in various aspects such as transmission resource waste and UE transmission power consumption. Particularly in the state that the channel condition is bad right after the handover, IR transmission is likely to fail and thus brings the problem of data transmission delay.

The fourth embodiment of the present invention proposes a method and apparatus that is capable of solving the above problem by reuse of ROHC context for a predetermined bearer in handover.

Figure 16:
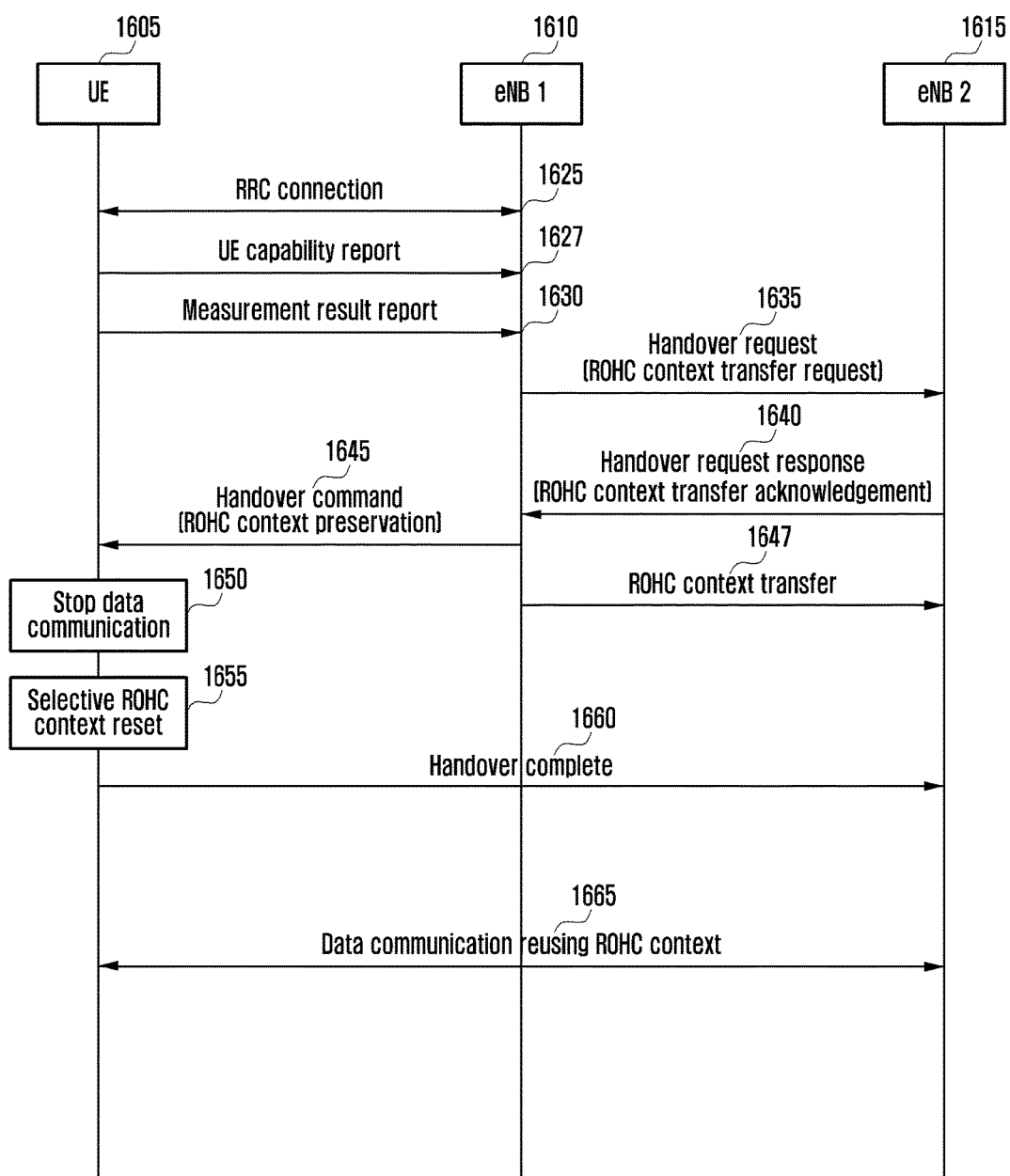
FIG. 16 is a diagram illustrating the overall operation of the fourth embodiment.

FIG. 16 shows the overall operation of the present invention.

Referring to FIG. 16, the UE 1605 establishes an RRC connection with the eNB 1 1610 at step 1625. The UE 1605 reports its capability in response to a request from the eNB, particularly supportability of the 'ROHC context preservation' function at step 1627.

Afterward, the UE 1605 and the eNB 1 1610 perform normal data communication. The eNB 1 1610 may configure the ROHC function to the bearer for which header compressed is necessary. The PDCP layer entity of the bearer configured with the ROHC function compresses or decompresses the header of IP packet using ROHC. The eNB 1 1610 configures measurement appropriately to the eNB 1605 to guarantee mobility of the UE 1605, and the UE 1605 reports, when measurement result fulfills a predetermined condition, the measurement result to the eNB 1630. For example, the channel state of the neighbor cell which is better than that of the serving cell lasts over a predetermined period, the UE reports the measurement result, and the eNB 1 1610 determines handover of the UE to a cell other than the current serving cell based on the measurement result. The eNB 1 1610 sends the eNB 2 1615 controlling the cell to which the handover is made a handover request message. The handover request message is identical with the message transmitted at step 1035 and includes the ROHC context transfer request information. The eNB 2 1615 determines whether to accept the handover and, if it is determined to accept, sends the eNB 1 1610 a handover request response message at step 1640. The handover request response message at step 1640 is identical with the message at step 1040 of FIG. 10 and includes the ROHC context transfer check information indicating the bearer to which ROHC context transfer is applied. The radio bearer is classified into one of Unacknowledged Mode (UM) bearer and Acknowledged Mode (AM) bearer depending on the characteristic of the RLC entity. The UM bearer is the bearer configured with an RLC entity which does not support Automatic Repeat Request (ARQ) function and configured for delay sensitive service such as VoIP. The AM bearer is the bearer configured with the RLC entity supporting ARQ function and configured for the service requiring reliability such as file download and web service. In the case of AM bearer, if the ROHC context is preserved in handover, it may cause a problem of ROHC context mismatch between the transmitter and receiver due to the retransmission on the RLC layer. Accordingly, it is preferred to restrict the ROHC context preservation operation to the UM bearer. The ROHC context transfer check information include the information on the bearer of which ROHC context is preserved among the UM bearers configured with ROHC.

The eNB 1 1610 sends the UE a handover command message at step 1645, and the message includes ROHC context preservation information. The ROHC context preservation information is the information instructing to preserve the ROHC context in handover for a predetermined bearer. The predetermined bearer may be the bearer indicated explicitly among the UM bearers configured with ROHC. If the handover command message is received, the UE stops data transmission/reception in the current serving cell and starts handover procedure to the target cell at step 1650. By stopping the data transmission/reception, it is possible to avoid updating the ROHC context. The UE resets the ROHC context selectively at step 1655. The UE 1605 resets the AM bearers among the bearers configured with ROHC. The UE 1605 preserves the context of predetermined UM bearer among the bearers configured with ROHC. The predetermined UM bearer may be the bearer indicated explicitly in the ROHC context preservation information.

If the downlink synchronization of the target cell is acquired, the UE 1610 performs random access procedure using the random access channel of the target cell and sends the eNB 1 1615 a handover complete message at step 1660. If the handover complete message has transmitted successfully, the UE and the eNB 2 1615 communicate header-compressed data using the ROHC context preserving a predetermined UM bearer without reset among the bearers configured with ROHC function and performs IR packet communication to establish ROHC context to the rest bearers at step 1665.

Detailed description on ROHC is specified in RFC 3095.

In FIG. 16, the eNB 1 and eNB 2 may be the same eNB and, in this case, the message exchange at steps 1635, 1640, and 1647 may be omitted.

The ROHC context preservation function is applied only when the delta-configuration is used in the handover command message but when the full configuration is used. In more detail, if fullConfig of the handover command (RRC-ConnectionReconfiguration) message is set to 'true' the ROHC context transfer or ROHC preservation function is not applied. Accordingly, if the handover command message to which the full-configuration has been applied is received, the UE 1605 resets the ROHC contexts of all bearers configured with ROHC and, otherwise if the handover command message to which the full-configuration has not been applied, preserves the ROHC context of predetermined UM bearer and resets the ROHC contexts of other bearers among the ROHC-configured bearers. If the full-configuration has been applied, this means that the UE releases all configurations used in the source cell and applies the configuration indicated in the handover command message; and if the delta-configuration is used or if full-configuration is not applied (i.e. if the fullConfig of the handover command message is set to false), this means that the configuration used in the source cell is applied in addition to the configuration indicated in the handover command message. The fullConfig is used when the release of the source eNB differs from that of the target eNB. Accordingly, it is efficient to not apply the ROHC context transfer to the handover using the fullConfig.

If the handover fails, the UE performs cell selection procedure and RRC connection reestablishment procedure in the selected cell. At this time, if the reestablishment procedure is performed while maintaining the ROHC context of the bearers for which ROHC context reservation is indicated in the handover procedure, the ROHC context mismatch between the UE and the eNB may cause communication error. In order to prevent this, when the handover failure occurs, the UE resets the preserved ROHC context other than the handover procedure.

Figure 17:
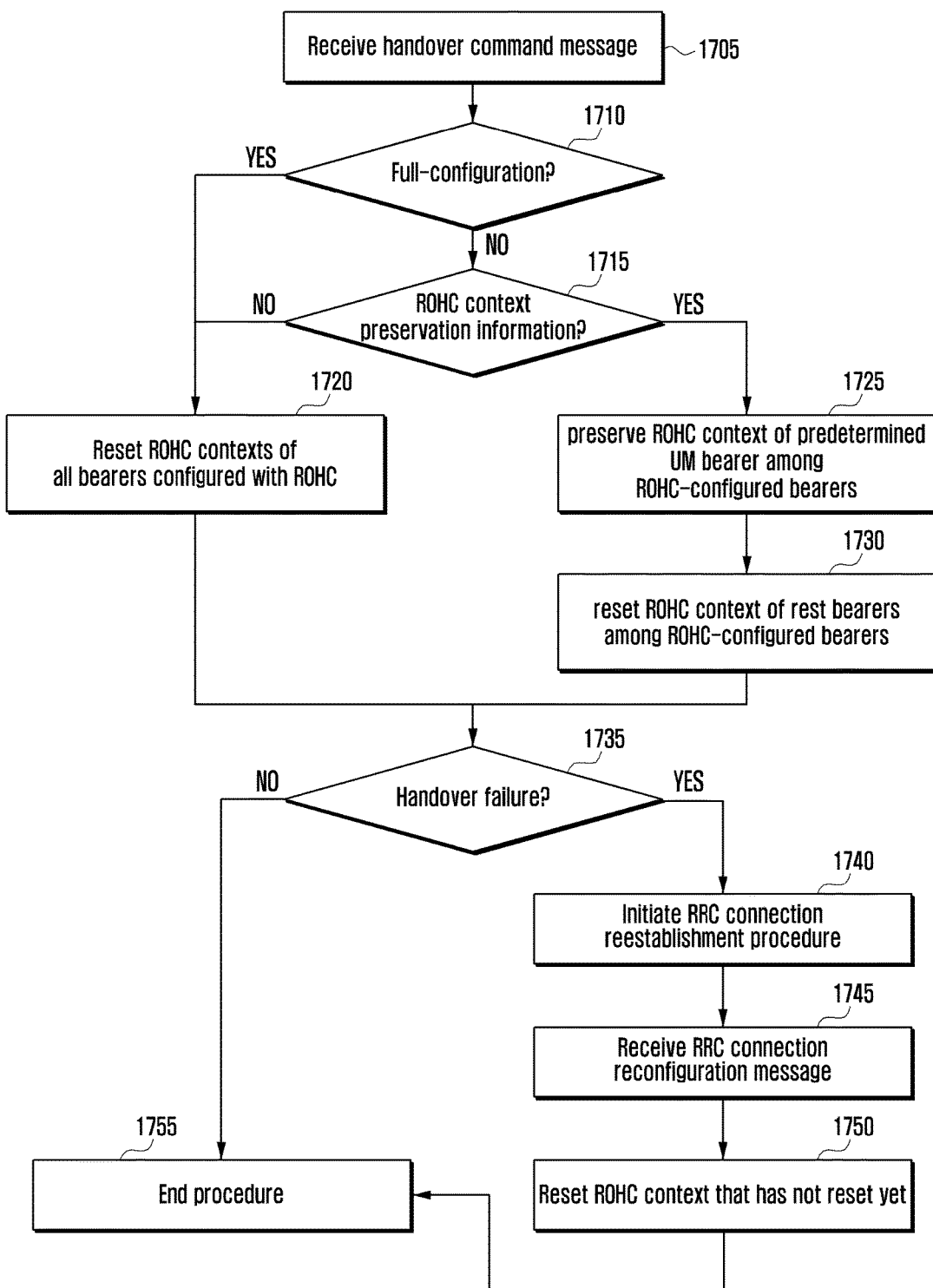
FIG. 17 is a diagram illustrating the UE operation of the fourth embodiment.

FIG. 17 shows the UE operation.

Referring to FIG. 17, the UE receives the handover command message at step 1705. The handover command message is the RRCConnectionReconfiguration message including control information called MobilityControlInfo Details of MobilityControlInfo and RRCConnectionReconfiguration are specified in 36.331.

At step 1710, the UE determines whether the full configuration is indicated. If so, the procedure goes to step 1720 and, otherwise, step 1715.

At step 1715, the UE determines whether the handover command message includes ROHC context preservation information. If so, the procedure goes to step 1725 and, otherwise, step 1720.

If the procedure goes to step 1720, this means that it is indicated to apply the full configuration in the handover command message or the handover command message includes not ROHC context preservation information and thus the UE resets the ROHC contexts of all bearer configured with ROHC. If the handover is indicated, the UE reestablishes PDCP of the ROHC-configured bearers and resets the ROHC context.

If the procedure goes to step 1725, this means that it is not indicated to apply the full configuration in the handover command message and the handover command message includes ROHC context preservation information. The UE preserves the ROHC context of a predetermined UM bearer without reset among the ROHC-configured bearers. The predetermined UM bearer may denote the UM bearer for which ROHC context preservation is indicated explicitly in the ROHC context preservation information. The UE reestablishes PDCP of the predetermined UM bearer and preserves the ROHC context with reset.

At step 1730, the UE resets the ROHC context of the bearers (i.e. AM bearers) with the exception of the predetermined UM bearers among the ROHC-configured bearers. That is, the UE reestablishes PDCP of the rest bearer and resets the ROHC context.

The UE initiates handover and start T304 timer. Then the UE executes a procedure for performing handover to the target cell. For example, the UE acquires downlink synchronization with the target cell and performs random access procedure in the target cell. If the random access procedure is not completed successfully in the target cell before the expiry of the T304 timer, the UE determines the handover failure and the procedure goes to step 1740. Otherwise if the random access procedure is completed successfully before the expiry of T304 timer, the UE determines that the handover is successful and ends the procedure at step 1755. At step 1740, the UE initiates the RRC connection reestablishment procedure. That is, the UE searches for accessible cells and selects one of the cells, transmits the RRC connection reestablishment request message through the random access channel of the selected cell, and receives the RRC connection reestablishment message transmitted by the eNB. If the RRC connection reestablishment message is received, the UE configures SRB. The UE waits until the RRC connection reconfiguration message is received to resume the rest radio bearers. If the RRC connection reconfiguration message is received at step 1745, the UE resets the ROHC contexts that have not been reset yet due to the operation at step 1725. Instead of resetting the ROHC contexts selectively, the UE may reset the ROHC contexts of all bearers. In this case, although the ROHC contexts which have been reset already are reset again, it is possible to avoid the increase of complexity caused in determining the bearers to be reset selectively.

Figure 18:
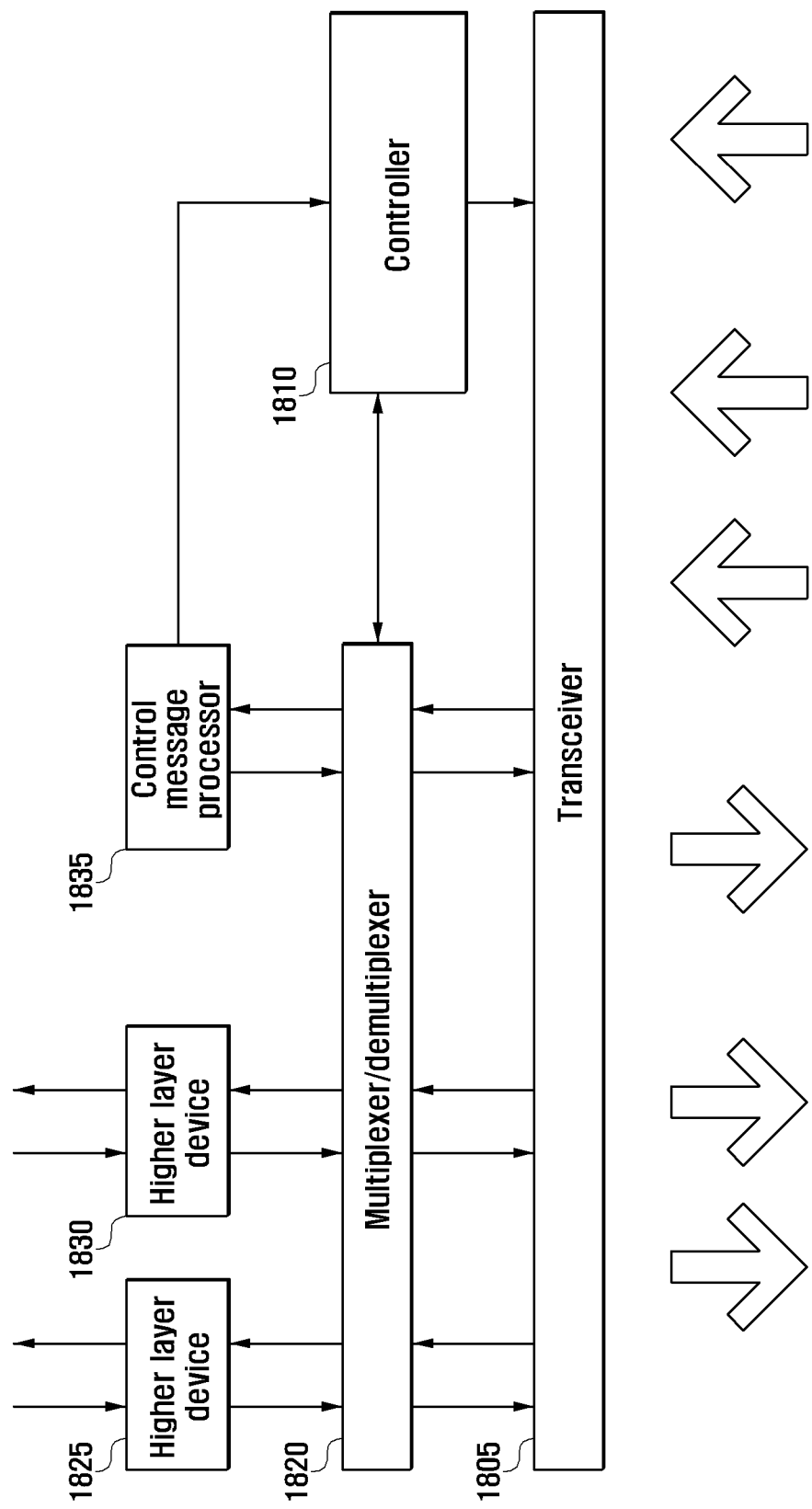
FIG. 18 is a diagram illustrating the UE.

FIG. 18 is a block diagram illustrating a configuration of the UE according to an embodiment of the present invention.

Referring to FIG. 18, the UE according to an embodiment of the present invention includes a transceiver 1805, a control unit 1810, a multiplexer/demultiplexer 1815, a control message processor 1835, and various higher layer processors 1825 and 1830.

The transceiver 1805 receives data and predetermined control signals through downlink channel of the serving cell and transmits data and control signals through uplink channel. In the case of a plurality of serving cells are configured, the transceiver 1805 transmits and received the data and controls signals through the plural serving cells.

The multiplexer/demultiplexer 1820 multiplexes the data generated by the higher layer processors 1825 and 1830 and the control message processor 1835 and demultiplexes the data received by the transceiver 1805 to deliver the demultiplexed data to the higher layer processors 1825 and 1830 or the control message processor 1835.

The control message processor 1135 is an RRC layer device and processes the control message received from the eNB to tack a necessary action. For example, the control message processor 1135 receives the RRC control message and sends the small cell identification signal information to the controller.

The higher layer processors 1825 and 1830 may be implemented per service and sends the data generated by the user service such as File Transfer Protocol (FTP) or Voice over Internet Protocol (VoIP) to the multiplexer/demultiplexer 1820 and processes the data from the multiplexer/demultiplexer 1820.

The controller 1810 checks the scheduling command, e.g. uplink grants, received by the transceiver 1805 and controls the transceiver 1805 and the multiplexer/demultiplexer 1820 to perform uplink transmission using appropriate transmission resource at an appropriate time. The controller controls the SCell configuration procedure, RRC connection configuration procedure, and handover procedure. In more detail, the controller controls the UE operations depicted in FIGS. 6, 7, 11, 12, 13, 14, 15, 16, and 17.

Figure 19:
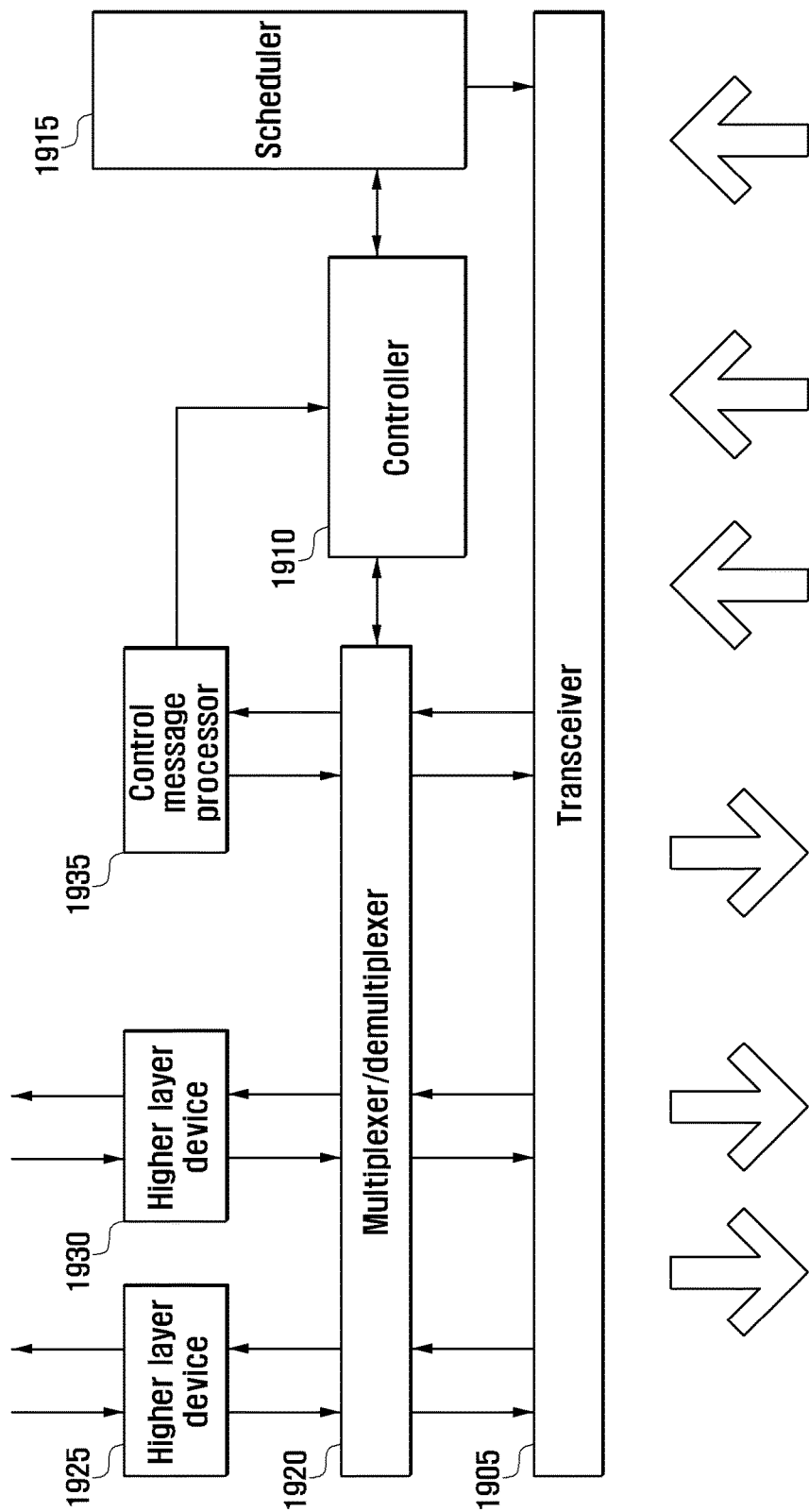
FIG. 19 is a diagram illustrating the eNB.

FIG. 19 is a block diagram illustrating a configuration of the eNB according to an embodiment of the present invention, and the eNB includes a transceiver 1909, a controller 1910, a multiplexer/demultiplexer 1920, a control message processor 1935, various higher layer processors 1925 and 1930, and a scheduler 1915.

The transceiver 1905 transmits data and predetermined control signals on the downlink carrier and receives data and predetermined control signals on the uplink carrier. If multiple carriers are configured, the transceiver 1905 transmits and receives the data and control signals on the multiple carriers.

The multiplexer/demultiplexer 1920 multiplexes the data generated by the higher layer processors 1925 and 1930 and the control message processor 1935 and demultiplexes the data from the transceiver 1905 to deliver the demultiplexed data to the appropriate higher layer processors 1925 and 1930, control message processor 1935, or the controller 1910. The control message processor 1935 processes the control message transmitted by the UE to take a necessary action and generates the control message to be transmitted to the UE to the higher layer.

The higher layer processors 1925 and 1930 are implemented per bearer and processes the data from the S-GW or another eNB to generate RLC PDU to the multiplexer/demultiplexer 1920 and processes the RLC PDU received from the multiplexer/demultiplexer 1920 to generate PDCP SDU to the S-GW or another eNB.

The scheduler 1215 allocates transmission resource to the UE at an appropriate time in consideration of the buffer state, channel state, and active time of the UE and controls the transceiver to process the signal transmitted by or to be transmitted to the UE.

The controller controls the SCell configuration procedure, RRC connection setup procedure, and handover procedure. In more detail, the controller controls the eNB operations in association with the UE operations as depicted in FIGS. 6, 7, 11, 12, 13, 14, 15, and 17.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A communication method by a base station of a wireless communication system, the method comprising:
   receiving, from a terminal, a first message including first information indicating whether the terminal supports a context continuation for a header compression; and
   transmitting, to the terminal, a second message associated with a handover,
   wherein information on the context for the header compression corresponding to at least one bearer for the handover is continued,
      if the handover is not associated with a full configuration,
      if the at least one bearer is mapped on unacknowledged mode, and
      if the second message includes second information indicating to continue a context for the header compression, and
   wherein the context for the header compression is a robust header compression (ROHC) context.

2. The method of claim 1, wherein the second information is included in the second message if a full configuration is not included in the second message.

3. The method of claim 1, wherein the information on the context for the header compression corresponding to the at least one bearer is reset, if the at least one bearer is mapped on the unacknowledged mode and the second information is not configured.

4. The method of claim 1, wherein the information on the context for the header compression corresponding to the at least one bearer is reset, if the at least one bearer is mapped on acknowledged mode.

5. A communication method by a terminal in a wireless communication system, the method comprising:
   transmitting, to a base station, a first message including first information indicating whether the terminal supports a context continuation for a header compression;
   receiving, from the base station, a second message associated with a handover; and
   continuing information on the context for the header compression corresponding to the at least one bearer,
      if the handover is not associated with a full configuration,
      if at least one bearer for the handover is mapped on unacknowledged mode, and
      if the second message includes second information indicating to continue a context for the header compression,
   wherein the context for the header compression is a robust header compression (ROHC) context.

6. The method of claim 5, wherein the second information is included in the second message if a full configuration is not included in the second message.

7. The method of claim 5, further comprises:
   resetting, if the at least one bearer is mapped on the unacknowledged mode and the second information is not configured, the information on the context for the header compression corresponding to the at least one bearer.

8. The method of claim 5, further comprises:
   resetting, if the at least one bearer is mapped on acknowledged mode, the information on the context for the header compression corresponding to the at least one bearer.

9. A base station in a wireless communication system, the base station comprising:
   a transceiver configured to transmit and receive a signal; and
   a controller coupled to the transceiver and configured to:
   receive, from a terminal, a first message including first information indicating whether the terminal supports a context continuation for a header compression, and
   transmit, to the terminal, a second message associated with a handover,
   wherein information on the context for the header compression corresponding to at least one bearer for the handover is continued,
      if the handover is not associated with a full configuration,
      if the at least one bearer is mapped on unacknowledged mode, and if the second message includes second information indicating to continue a context for the header compression, and wherein the context for the header compression is a robust header compression (ROHC) context.

10. The base station of claim 9, wherein the second information is included in the second message if a full configuration is not included in the second message.

11. The base station of claim 9, wherein the information on the context for the header compression corresponding to the at least one bearer is reset, if the at least one bearer is mapped on the unacknowledged mode and the second information is not configured.

12. The base station of claim 9, wherein the information on the context for the header compression corresponding to the at least one bearer is reset, if the at least one bearer is mapped on acknowledged mode.

13. A terminal communicating data in a wireless communication system, the terminal comprising:
 a transceiver configured to transmit and receive a signal; and
 a controller coupled to the transceiver and configured to:
  transmit, to a base station, a first message including first information indicating whether the terminal supports a context continuation for a header compression,
  receive, from the base station, a second message associated with handover, and
  continue information on the context for the header compression corresponding to the at least one bearer,
  if the handover is not associated with a full configuration,
  if at least one bearer for the handover is mapped on unacknowledged mode, and
  if the second message includes second information indicating to continue a context for the header compression,
 wherein the context for the header compression is a robust header compression (ROHC) context.

14. The terminal of claim 13, wherein the second information is included in the second message if a full configuration is not included in the second message.

15. The terminal of claim 13, wherein the controller is further configured to reset, if the at least one bearer is mapped on the unacknowledged mode and the second information is not configured, the information on the context for the header compression corresponding to the at least one bearer.

16. The terminal of claim 13, wherein the controller is further configured to reset, if the at least one bearer is mapped on acknowledged mode, the information on the context for the header compression corresponding to the at least one bearer.

* * * * *